US012484473B2

(12) United States Patent
McCutcheon, IV et al.

(10) Patent No.: US 12,484,473 B2
(45) Date of Patent: Dec. 2, 2025

(54) AUTONOMOUS LAWN MOWER

(71) Applicant: Scythe Robotics, Inc., Longmont, CO (US)

(72) Inventors: Robert Johnstone McCutcheon, IV, Longmont, CO (US); John Gordon Morrison, Longmont, CO (US); Isaac Heath Roberts, Longmont, CO (US); Kevin Peter McGlade, Denver, CO (US); Davis Thorp Foster, Boulder, CO (US); Matthew Alexander Kaplan, Fort Collins, CO (US); Zachary Austin Goins, Boulder, CO (US); Matthew G. Quick, Erie, CO (US)

(73) Assignee: SCYTHE ROBOTICS, INC., Longmont, CO (US)

( * ) Notice: Subject to any disclaimer, the term of this patent is extended or adjusted under 35 U.S.C. 154(b) by 925 days.

(21) Appl. No.: 17/342,208

(22) Filed: Jun. 8, 2021

(65) Prior Publication Data

US 2022/0174866 A1    Jun. 9, 2022

Related U.S. Application Data

(60) Provisional application No. 63/121,515, filed on Dec. 4, 2020.

(51) Int. Cl.
*A01D 34/00* (2006.01)
*A01D 34/78* (2006.01)
(Continued)

(52) U.S. Cl.
CPC ........... *A01D 34/008* (2013.01); *A01D 34/78* (2013.01); *A01D 34/828* (2013.01); *A01D 69/02* (2013.01);
(Continued)

(58) Field of Classification Search
CPC .... A01D 34/008; A01D 34/78; A01D 34/828; A01D 69/02; A01D 34/66;
(Continued)

(56) References Cited

U.S. PATENT DOCUMENTS

| 6,255,793 B1 * | 7/2001 | Peless ..................... G01C 22/00 318/580 |
| 8,141,886 B1 | 3/2012 | Sugden et al. |

(Continued)

FOREIGN PATENT DOCUMENTS

| CN | 110 326 423 A | 10/2019 |
| EP | 0864018 B1 | 7/1997 |

(Continued)

OTHER PUBLICATIONS

International Search Report and Written Opinion for application No. PCT/US2021/061936, dated Feb. 17, 2022.

*Primary Examiner* — Tyler J Lee
(74) *Attorney, Agent, or Firm* — Dorsey & Whitney LLP

(57) ABSTRACT

An autonomous lawn mower is described. The autonomous lawn mower comprises a chassis supporting a podium. In some examples, the podium comprises a top portion that may support one or more sensors, antennas and/or cameras that may be used to provide environmental information regarding the surroundings of the autonomous lawn mower. In additional or alternative examples, the autonomous lawn mower receives, via a wireless receiver, a signal from a remote controller, the signal comprising one or more of an emergency stop signal or a pause signal. Based at least in part on the signal comprising the emergency stop signal, causing the autonomous lawn mower to invoke an emergency stop procedure, or based at least in part on the signal comprising the pause signal, causing the autonomous lawn mower to invoke a pause procedure.

20 Claims, 14 Drawing Sheets

(51) Int. Cl.

| | |
|---|---|
| *A01D 34/82* | (2006.01) |
| *A01D 69/02* | (2006.01) |
| *B60Q 1/26* | (2006.01) |
| *B60Q 9/00* | (2006.01) |
| *B60T 7/16* | (2006.01) |
| *B60T 7/22* | (2006.01) |
| *F21S 43/14* | (2018.01) |
| *F21S 43/20* | (2018.01) |
| *G05D 1/00* | (2006.01) |
| *G05D 1/245* | (2024.01) |
| *G05D 1/248* | (2024.01) |
| *G05D 1/249* | (2024.01) |
| *G08C 17/02* | (2006.01) |
| *H04N 13/246* | (2018.01) |
| *H04N 23/50* | (2023.01) |
| *A01D 34/66* | (2006.01) |
| *A01D 101/00* | (2006.01) |
| *F21Y 115/10* | (2016.01) |

(52) U.S. Cl.
CPC .............. *B60Q 1/2611* (2013.01); *B60Q 9/00* (2013.01); *B60T 7/16* (2013.01); *B60T 7/22* (2013.01); *F21S 43/14* (2018.01); *F21S 43/26* (2018.01); *F21S 43/2605* (2024.05); *G05D 1/0246* (2013.01); *G05D 1/027* (2013.01); *G05D 1/0278* (2013.01); *G05D 1/245* (2024.01); *G05D 1/248* (2024.01); *G05D 1/249* (2024.01); *G08C 17/02* (2013.01); *H04N 13/246* (2018.05); *H04N 23/50* (2023.01); *A01D 34/66* (2013.01); *A01D 2101/00* (2013.01); *F21Y 2115/10* (2016.08)

(58) Field of Classification Search
CPC ...... A01D 2101/00; F21S 43/14; F21S 43/26; H04N 13/246; H04N 23/50; H04N 13/239; H04N 17/002; H04N 23/698; H04N 23/90; H04N 7/181; B60K 2007/0092; B60K 7/0007; B60Q 1/2611; B60Q 1/507; B60Q 2800/20; B60Q 9/00; B60T 7/16; B60T 7/22; F21Y 2115/10; G05D 1/0246; G05D 1/027; G05D 1/0278; G08C 17/02

See application file for complete search history.

(56) References Cited

U.S. PATENT DOCUMENTS

| | | | |
|---|---|---|---|
| 9,864,376 | B2 | 1/2018 | Franzius |
| 11,172,605 | B2 | 11/2021 | Hahn et al. |
| 11,300,975 | B2 * | 4/2022 | Dalfra ................. G05D 1/0259 |
| 2002/0104300 | A1 * | 8/2002 | Hunt .................... A01D 34/008 |
| | | | 56/10.6 |
| 2003/0144774 | A1 | 7/2003 | Trissel et al. |
| 2005/0016787 | A1 * | 1/2005 | Lesesky ............. H04B 10/1143 |
| | | | 180/311 |
| 2006/0072914 | A1 | 4/2006 | Arai et al. |
| 2007/0024740 | A1 | 2/2007 | Strong |
| 2008/0304705 | A1 | 12/2008 | Pomerleau et al. |
| 2011/0071718 | A1 | 3/2011 | Norris et al. |
| 2013/0074466 | A1 | 3/2013 | Zwieg et al. |
| 2013/0110322 | A1 * | 5/2013 | Jagenstedt .......... A01B 79/005 |
| | | | 701/2 |
| 2015/0025755 | A1 * | 1/2015 | Willgert ............. A01B 69/007 |
| | | | 701/50 |
| 2015/0296707 | A1 | 10/2015 | Fukuda et al. |
| 2015/0366134 | A1 | 12/2015 | Dollinger et al. |
| 2016/0046468 | A1 * | 2/2016 | Heravi ..................... B66D 1/54 |
| | | | 715/835 |
| 2016/0282866 | A1 * | 9/2016 | Yamamura .......... A01D 34/008 |
| 2017/0124781 | A1 | 5/2017 | Douillard et al. |
| 2017/0139418 | A1 * | 5/2017 | Hiramatsu .......... A01B 69/008 |
| 2017/0183845 | A1 * | 6/2017 | Izumikawa ............. E02F 3/435 |
| 2017/0282784 | A1 | 10/2017 | Foster et al. |
| 2017/0307148 | A1 | 10/2017 | Sharrah et al. |
| 2017/0322562 | A1 * | 11/2017 | Churavy ............. A01D 34/008 |
| 2017/0344020 | A1 | 11/2017 | Grufman et al. |
| 2018/0103579 | A1 | 4/2018 | Deimert et al. |
| 2018/0139886 | A1 | 5/2018 | Wahlgren |
| 2018/0339409 | A1 | 11/2018 | Bal et al. |
| 2018/0361584 | A1 | 12/2018 | Bal et al. |
| 2018/0364045 | A1 | 12/2018 | Bal et al. |
| 2019/0021226 | A1 | 1/2019 | Dima et al. |
| 2019/0049968 | A1 | 2/2019 | Dean et al. |
| 2019/0248421 | A1 | 8/2019 | Jacobsthal |
| 2020/0042009 | A1 | 2/2020 | Yang |
| 2020/0062321 | A1 | 2/2020 | Redinger et al. |
| 2020/0217932 | A1 | 7/2020 | Gilliland et al. |
| 2020/0278691 | A1 * | 9/2020 | Dalfra .................. G05D 1/0265 |
| 2021/0100160 | A1 | 4/2021 | Kang |
| 2021/0232114 | A1 * | 7/2021 | Stagg .................... H04W 76/10 |
| 2021/0347059 | A1 * | 11/2021 | Zhang ..................... B25J 9/1697 |
| 2021/0362718 | A1 * | 11/2021 | Ikenori ................ B60W 10/184 |
| 2022/0108152 | A1 | 4/2022 | Neumann |
| 2022/0108184 | A1 | 4/2022 | Neumann |
| 2022/0248599 | A1 | 8/2022 | Joo |
| 2023/0263093 | A1 | 8/2023 | Suffolk |
| 2023/0337577 | A1 | 10/2023 | He |

FOREIGN PATENT DOCUMENTS

| | | |
|---|---|---|
| EP | 2884364 A1 | 6/2015 |
| JP | 3318170 B2 | 8/2002 |
| WO | WO-2018103065 A1 | 6/2016 |
| WO | WO-2018000922 A1 | 1/2018 |
| WO | WO-2018142482 A1 | 8/2018 |
| WO | WO-2018153699 A1 | 8/2018 |
| WO | WO-2018224678 A1 | 12/2018 |
| WO | WO-2019032864 A1 | 2/2019 |
| WO | WO-2019157072 A2 | 8/2019 |
| WO | WO-2019241923 A1 | 12/2019 |
| WO | WO 2021/247790 A1 | 12/2021 |
| WO | WO 2022/251088 A1 | 12/2022 |

* cited by examiner

AUTONOMOUS LAWN MOWER

RELATED APPLICATIONS

This application claims benefit to U.S. Provisional Patent Application Ser. No. 63/121,515, filed 4 Dec. 2020 and entitled "Autonomous Lawn Mower," which is hereby incorporated herein in its entirety by reference.

BACKGROUND

Autonomous systems rely on sensors for performing autonomy. Hybrid systems (e.g., those that allow manual, semi-autonomous, and autonomous control) may suffer from various constraints, limiting the functionality and/or safety of the system. For example, designs optimized for manual control may be made at the cost of sensor coverage and vice versa, thereby impacting the convenience of a manual operator or the ability for the system to detect and operate safely while operating autonomously. Further, such systems may not have adequate means for alerting a user proximate the device regarding the state of the system or to have adequate emergency stop capabilities to protect persons and property from inadvertent damage.

BRIEF DESCRIPTION OF THE DRAWINGS

The invention will now be described, by way of example, with reference to the accompanying drawings, where like numerals denote like elements, a leftmost numeral indicates the original figure in which the element is found, and in which.

DETAILED DESCRIPTION

Figure 1:
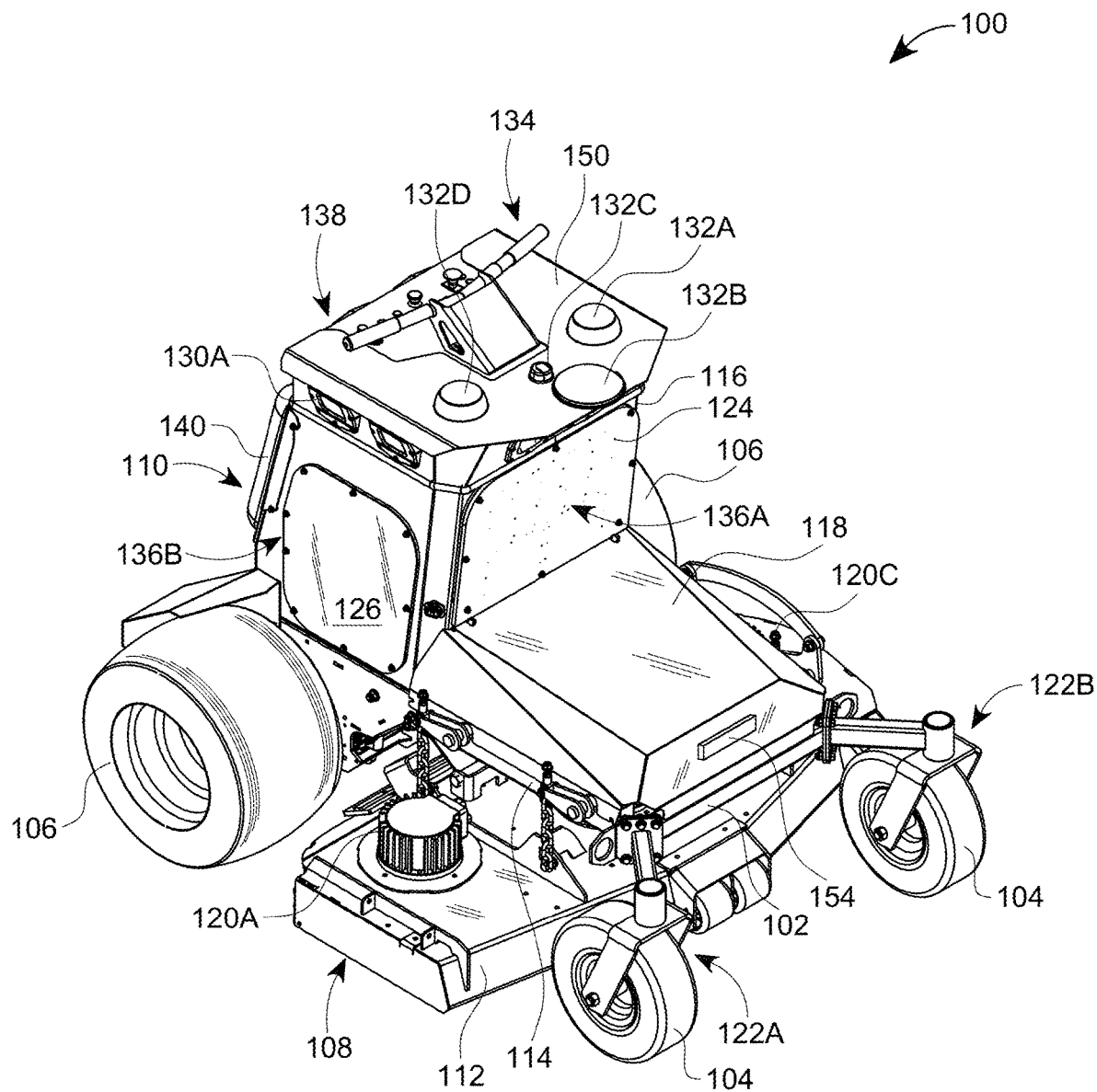
FIG. 1 is a front perspective view of an autonomous lawn mower in accordance with at least one example of the invention.
Figure 2:
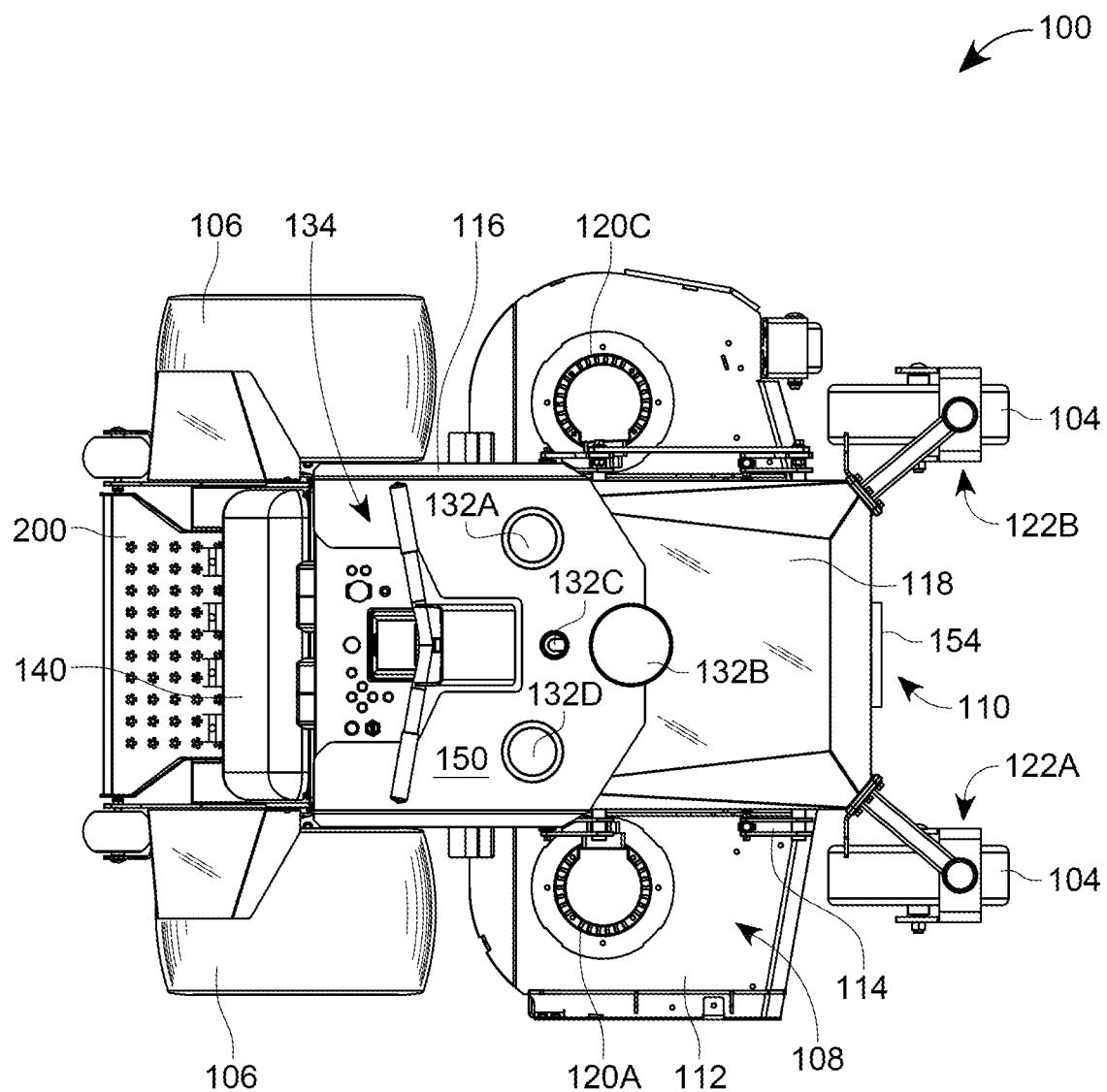
FIG. 2 is a top view of the autonomous lawn mower of FIG. 1 in accordance with at least one example of the invention.

The following detailed description describes techniques (e.g., methods, processes, and systems) that may be used by a lawn mower capable of autonomously mowing grass. In those examples described in detail herein in which one or more autonomous mowers may be used for mowing. If a plurality of autonomous lawn mowers are used in the mowing process, their activity is choreographed such that the mowers work together to complete a mowing task. Each mower comprises a suite of sensors and displays to enable the mower to understand its environment as well as communicate to human operators, technicians, managers, customers, and bystanders.

Generally speaking, a mower fleet comprises a plurality of individual mowers, which may be combinations of autonomous, semi-autonomous, and/or manually controlled mowers. Depending on the size of the mowing job, one or more mowers are allocated to a given site. On a given job site, the mowing may be performed using a mix of some autonomous mowers, some semi-autonomous mowers (e.g., those mowers which may have some capabilities which are autonomous and/or which are capable of operating autonomously for at least a portion of the time) and some mowers being driven by humans (i.e., manual mowers). Each autonomous or semi-autonomous mower has a suite of sensors to primarily facilitate autonomous or semi-autonomous mowing. Such sensors may comprise, for example, one or more of cameras, radar, pose (position and/or orientation) systems (including Global Positioning System (GPS) receiver and or a Global Navigation Satellite System (GLONASS) receiver), diagnostic sensors, Inertial Measurement Units (IMUs) (which in turn may comprise accelerometers, gyroscopes, magnetometers, etc.), torque sensors, wheel rotation sensors (e.g., rotary encoders, Hall sensors, etc.) or the like. This suite of sensors provides a view of the environment in which the autonomous mower is operating such that the mower can explore the environment to identify obstacles and generate mow patterns.

In one example, the sensor suite is mounted atop a podium that serves to position the sensor suite high above the ground to provide the sensors an optimal view of the mower surroundings. The podium also forms a control center behind which an operator may stand on a platform and manually control the mower, when necessary. The manual mower controls are positioned atop the podium for easy access by an operator standing on a platform located behind the podium. In additional or alternate examples, such a podium may comprise one or more features to improve both the access by the operator as well as function of the sensors. As a non-limiting example of such, portions of such a podium may be inclined (or raked) to promote a restful position of a user while simultaneously optimizing a field of view of one or more sensors attached thereto. Further, one or more portions of sch a podium may extend out over one or more of the sensors (without impinging on a field of view) to eliminate or reduce glare or other interferences. As such, designs discussed in detail herein may improve the comfort of an operator while operating manually (or semi-autonomously) while optimizing sensor coverage and minimizing environmental impacts to sensor operation (whether in manual, semi-autonomous, or autonomous operation).

In addition, the mower communicates with operators, technicians, managers, customers, and bystanders through a number of communications channels. WiFi and cellular communication channels are used to communicate to local operators and technicians as well as communicate with remote data collection and analysis servers such that technicians, managers and customers may be informed of the mower status and activity. Various personnel may access mower status via mobile and/or desktop applications which connect through wireless communications channels directly to the mower and/or via one or more servers.

In one example, the mower itself may communicate to local personnel as well as bystanders via a visual communication channel. For example, the mower may comprise illuminating devices that change color and/or display graphics/text to indicate the status of the mower. In one particular example, the mower comprises an LED ribbon that circumscribes a portion of the mower such that the indicator ribbon is viewable from all positions surrounding the mower, i.e., a 360 degree indicator. As described below, the indicator displays various colors, text and/or graphics depending upon mower status.

The techniques described herein may provide a technical solution to a technical problem of determining a situational environment in which an autonomous mower is operating or has operated to optimize the behavior of the mower and/or a related mower fleet as well as communicate mower status through various channels to mower operations personnel and/or bystanders. The techniques described herein may improve the functioning of a computer through function optimization, improved processing efficiencies, improved and optimized autonomous behavior of mower(s), improved communications, etc. Such techniques may further improve the safe operation of such a mower when used such that users and others proximate the device may instantaneously recognize a state of the device (e.g., acting autonomously, experiencing a fault, undergoing a loss of communication, update status, etc.) and react accordingly. It would be appreciated that the techniques described herein would be equally applicable to any other service robotics platform and/or fleets thereof such as, but not limited to, other agricultural tasks—harvesting, planting, etc., naval tasks (whether submarine, surface vessel or otherwise), and the like.

FIG. 1 is front perspective schematic view of an autonomous lawn mower 100 in accordance with at least one example of the invention. FIGS. 2, 3, 4, 5, 6 are respectively top, side, bottom, rear and front views of the autonomous lawn mower 100 of FIG. 1 in accordance with at least one example of the invention. In an example of the autonomous mower 100, the mower may be powered by electricity. In other examples (whether autonomous or otherwise), the mower may have another form of energy source, e.g., gasoline, diesel, natural gas, liquid propane, fuel cell, hydrogen, or the like. The mower has one or more drive mechanisms, e.g., motors, facilitating movement of the mower as well as rotating the cutting blades, where the drive mechanism is of a type commensurate with the energy source.

As shown in FIGS. 1 through 6, the mower 100 may comprise a chassis 102, front and rear wheels 104 and 106, mower deck assembly 108, and a mower body 110. The mower deck assembly 108 comprises a mower deck 112 and a mower deck control mechanism 114. The chassis 102 may support the mower body 110, comprising a podium 116 and a hood 118, which houses batteries, motors and control electronics (internal to the body 110, thus not shown in FIGS. 1 through 6). In one example, the mower body 110 is isolated from chassis vibration by resilient members (e.g., rubber bushings, not shown) that couple the body components to the chassis 102. Such a construction reduces vibration of the sensors that are attached to the body 110, as described below. In addition, in an example, the podium 116 is modular and can be removed from the chassis through the removal of a limited number of fasteners, e.g., ten bolts.

The mower deck control mechanism 114 couples the chassis 102 to the mower deck 112 may comprises actuator(s) to raise and lower the mower deck 112 relative to the chassis 102 and ground as well as an actuator (e.g., motor(s) 120A, 120B, 120C) to drive one or more blades (e.g., blades 400A, 400B, and 400C in FIG. 4) within the mower deck 112.

Figure 4:
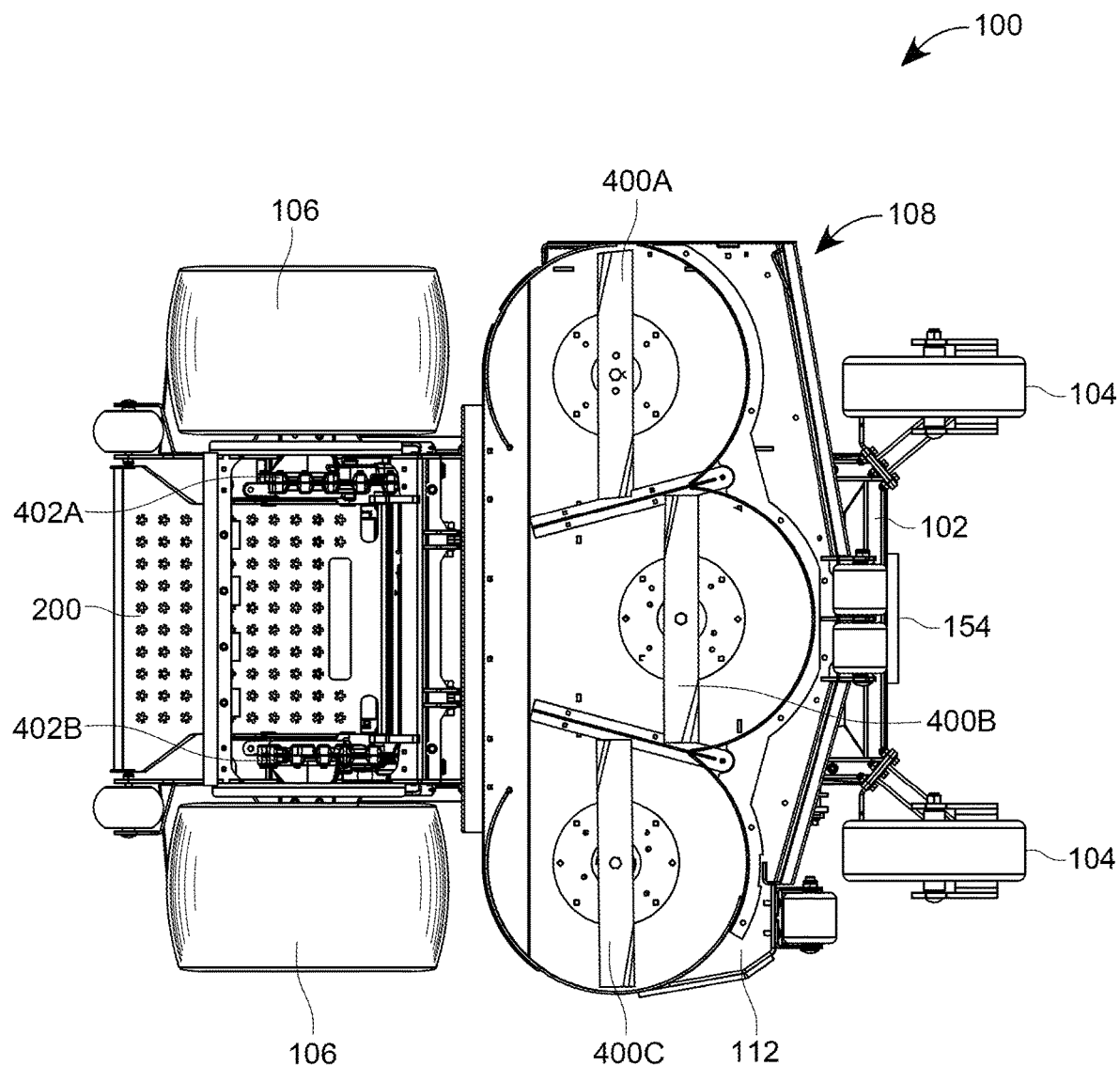
FIG. 4 is a bottom view of the autonomous lawn mower of FIG. 1 in accordance with at least one example of the invention.
Figure 5:
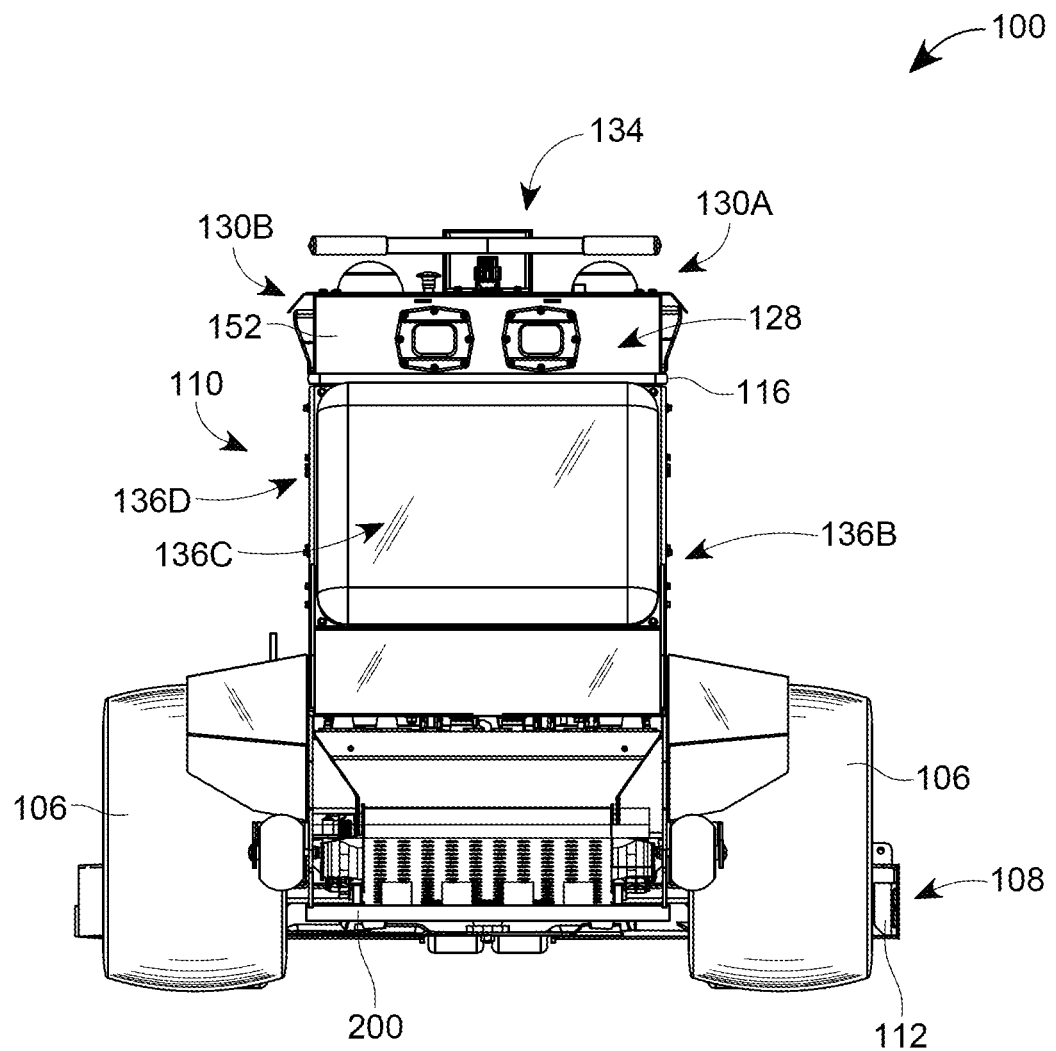
FIG. 5 is a rear view of the autonomous lawn mower of FIG. 1 in accordance with at least one example of the invention.
Figure 6:
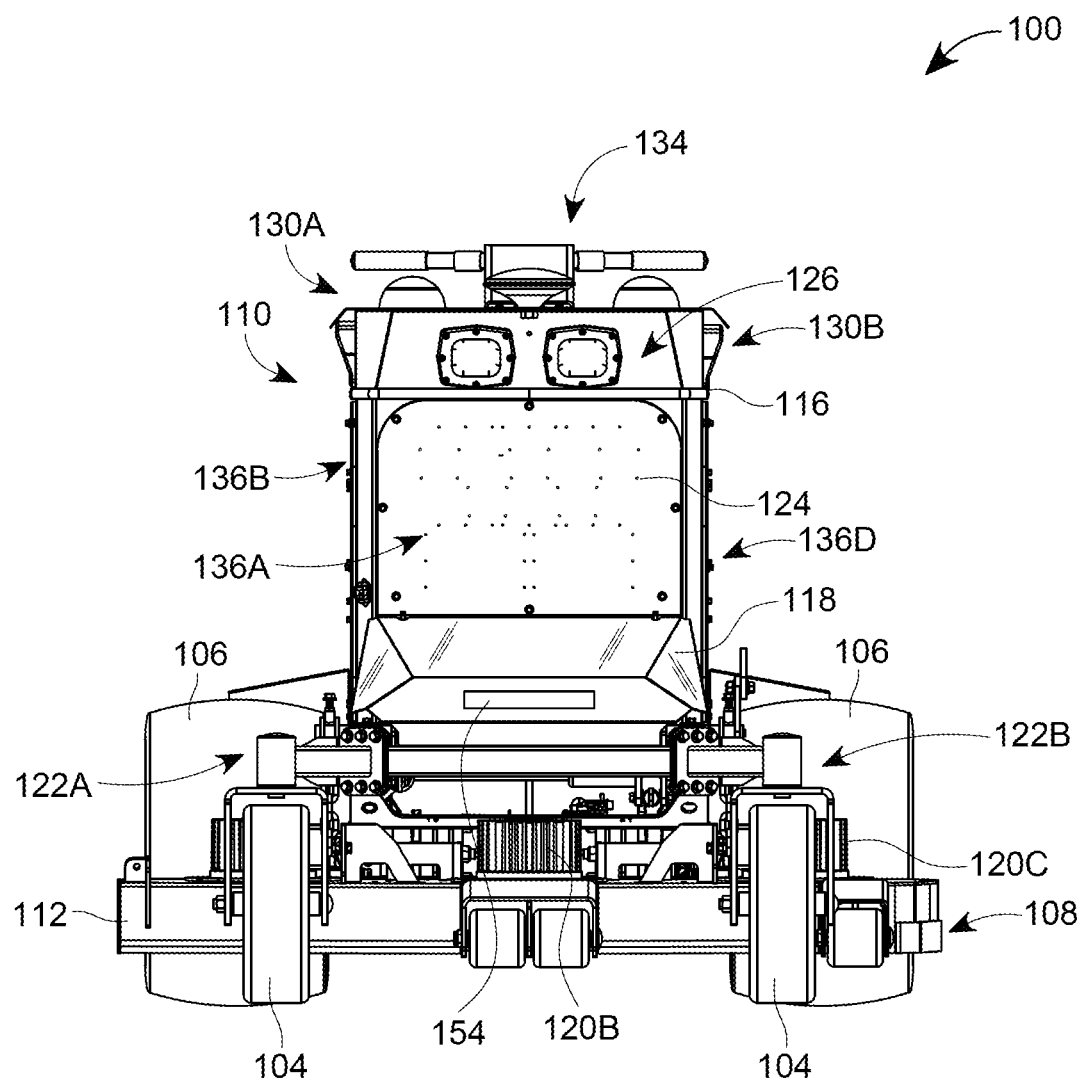
FIG. 6 is a front view of the autonomous lawn mower of FIG. 1 in accordance with at least one example of the invention.

In an example, each rear wheel 106 may be coupled to a drive mechanism, e.g., at least one motor (e.g., motors 402A and 402B in FIG. 4). For example, each wheel may be directly driven by a separate electric motor. In other examples, the drive mechanism may include a transmission and/or other form of gearing between the wheels and the motor(s). The front wheels 104 may be "free-wheeling" in that they are not driven nor are they steered. In such examples, the front wheels 104 comprise, for example, castors. Each wheel 104 may be coupled to the chassis 102 via a wheel mounting assembly 122A and 122B (e.g., a wheel mounting fork coupled to a spindle to form a castor). In this manner, steering of the mower is effectuated through applying differential rotation of the rear wheels 106. Such differential rotation may be created through rotating each wheel at the same speed and braking one wheel relative to the other or rotating each wheel at a different speed through control of independent wheel drive motors. In other examples, the rear wheels may be driven at equal speeds and a steering assembly may be used to steer the front wheels.

The podium 116 may comprise a front access panel 124 and side access panels 126 to facilitate access to an energy source (e.g., batteries or fuel tank) as well as drive mechanism(s), control electronics, communications electronics, sensor electronics or the like. The electronics and processes utilized to operate such an autonomous mower 100 are described in detail in U.S. patent application Ser. No. 16/985,495, filed 5 Aug. 2020 entitled "Autonomous Lawn Mower" (the '495 application) which is hereby incorporated herein by reference in its entirety.

The exterior of the podium 116 supports various sensors including but not limited to forward viewing camera(s) 126, rear viewing camera(s) 128, side viewing camera(s) 130A and 130B, and various radomes 132A, 132B, 132C and 132D which cover various antennas and sensors. The sensor elements used by the autonomous mower 100 and described in detail in the '495 application may include one or more of cameras (whether stereo, RGB, monochromatic, infrared, ultraviolet, hyperspectral, etc.), radar(s), lidar(s), acoustic sensors, accelerometer(s), gyroscope(s), torque sensor(s), magnetometer(s), location system(s), battery management systems, wheel encoder(s), motor sensor(s), orientation sensor(s), and/or the like. These sensors may be located within the radomes 132A, 132B, 132C and 132D or located elsewhere on the mower 100.

The sensors gather information regarding the environment surrounding the autonomous lawn mower 100 such that the mower 100 is able to autonomously mow a region of lawn within a specified boundary as well as identify obstacles to be avoided, ignored, or cause the mower to cease operation and request human assistance.

The mower 100 may also comprise an instrument panel 134 for enabling manual control of the mower 100. The instrument panel 134 may be removable. A description of an embodiment of the instrument panel and its operation is contained in commonly assigned U.S. patent application Ser. No. 16/891,281, filed 3 Jun. 2020, entitled "Control Interface For Autonomy," which is hereby incorporated herein by reference in its entirety.

The podium 116 comprises four sidewalls 136A, 136B, 136C, 136D and a top portion 138. The sidewalls 136B and 136D may contain identical access panels 126. The front sidewall 136A may contain the access panel 124. The rear sidewall 136C supports a resilient pad 140 (typically, a foam pad) upon which an operator may position their knees or thighs while standing upon the platform (200 in FIG. 2) and manually driving the mower 100. The podium 116 may comprise gaskets and o-rings to seal all removable panels and seal egress apertures such that the podium 116 is waterproof.

Figure 3:
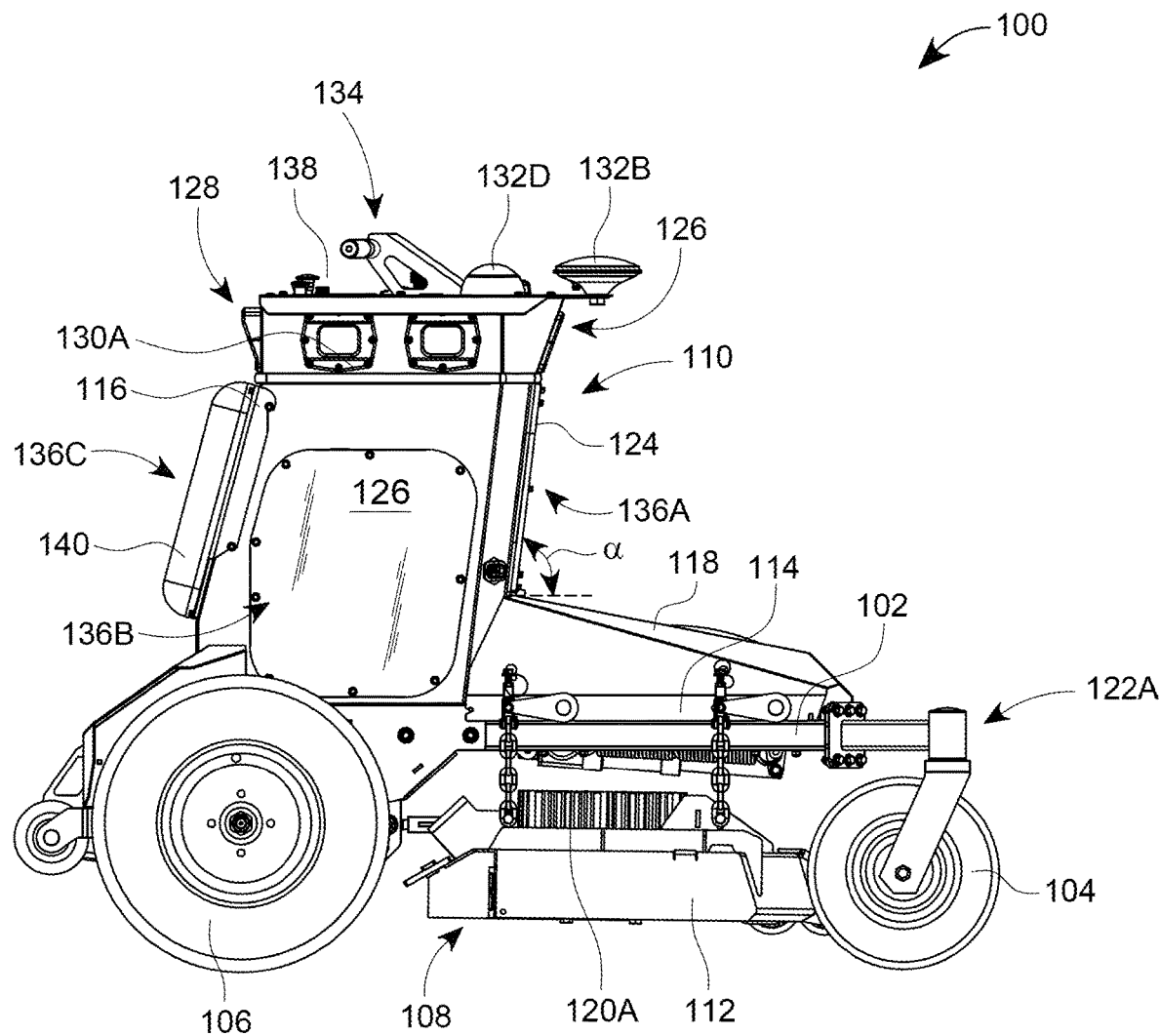
FIG. 3 is a side view of the autonomous lawn mower of FIG. 1 in accordance with at least one example of the invention.

As depicted in the side view of FIG. 3, in one example of the invention, the podium 116 is tilted or raked forward at a defined angle, $\alpha$, to a horizontal plane. In one example, the angle $\alpha$ is in a range of about seventy to eighty-five degrees. In some examples, the angle may be different for the rear surface of the podium (e.g., about seventy-five degrees) compared to the front surface of the podium (e.g., about eighty-five degrees). By raking the podium forward, the operator is more comfortably positioned behind pad 140, the podium front sidewall 136A is partially shaded by the remainder of the podium 116 and the angle of incidence of sunlight onto the front sidewall 136A is reduced. Such shading and reduction in the sunlight angle of incidence provides a lower temperature region in which sensitive electronics and/or heat sinks for electronics may be positioned inside the front panel 124. As such, any angle may be used that promotes comfort to the operator by raking the rear podium surface and/or provides shade for the electronics by raking the front podium surface. In one example, behind the front sidewall 136A is positioned a heat sink (not shown) for the mower electronics. Such placement maximizes heat dissipation by placing the heat sink in a shaded region as well as places the heat sink where maximum heat dissipating air flow occurs. The hood 118 is also sloped downward from the podium 116 to the front wheels 104 to create aerodynamics that, as the mower 100 moves forward, drives air toward the front sidewall 136A of the podium 116 to provide further cooling.

In one example, the top portion 138 of the podium 116, which supports many of the sensors that detect the environment surrounding the mower 100 and supports the communications antennas, is modular, i.e., the top portion 138 is removable from the podium 116. The top portion 138 comprises a substantially planar plate 150 that supports a plurality of radomes, for example, radomes 132A, 132B, 132C, 132D that protect various sensors and antennas. The four sides 152 of the top portion 138 also support a plurality of cameras 126, 128, 130A and 130B. By placing the sensors at the highest point on the mower 100, the sensors have an optimal view of the surrounding environment and the sky. In at least some examples, one or more portions of the podium may extend over one or more of the sensors (e.g., as illustrated in FIG. 1, the top portion 138 slightly extends over the one or more cameras 130). In such examples, the extension may prevent stray light, glare, or otherwise from negatively impacting sensor data accumulation. Further, by being slightly inclined, such cameras 130 may be positioned and/or oriented so as to maximize a usable field of view (e.g., such that a majority of the data is used to control the system (proximate terrain, actual and potential obstacles, etc.). In at least some examples, pairs of cameras 130 may comprise a stereo pair defined by a baseline (distance therebetween) that may be scan line rectified. In such examples, placement of the stereo pair in the podium may allow for wider baselines (and increased depth resolution). In addition, by placing the sensors and antennas at the top of the podium, they are positioned as far away as possible from the internally located motor control circuits. The motor control circuits may be electrically noisy and create electromagnetic signals that interfere with the sensors and communications signal processing, especially weak GPS and GNSS satellite signals. As such, the motor control circuits are mounted low in the podium near the rear wheels. In this position, there are many metallic components (e.g., metallic supports, batteries, and the like) within the podium between the motor control circuits to attenuate the internally generated electromagnetic noise.

Figure 7:
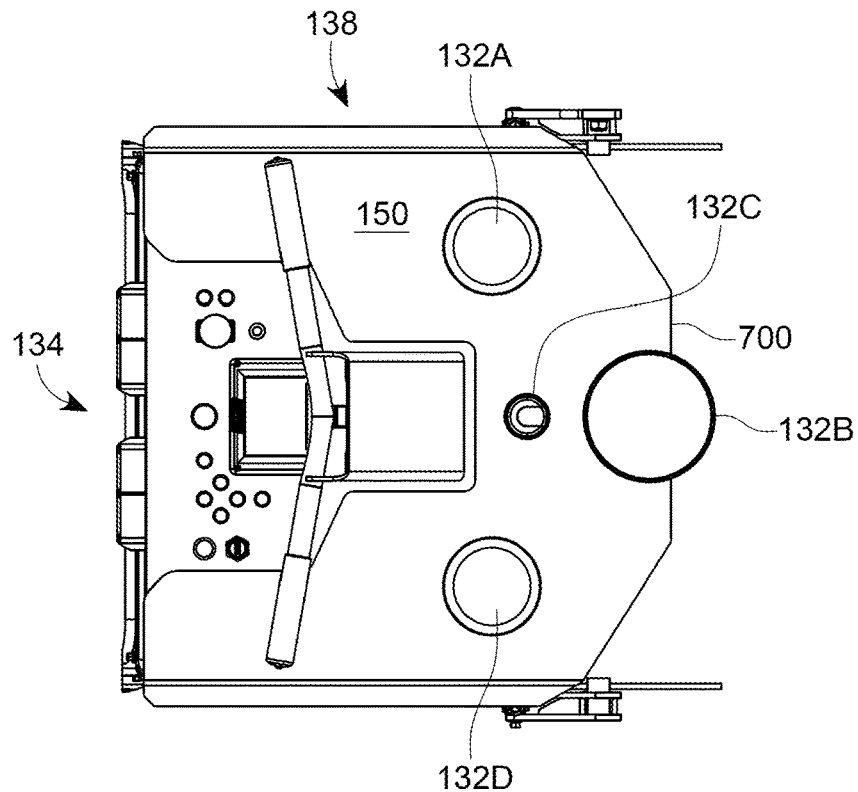
FIG. 7 is a detailed top view of a sensor suite of the autonomous lawn mower of FIG. 1 in accordance with at least one example of the invention.
Figure 8:
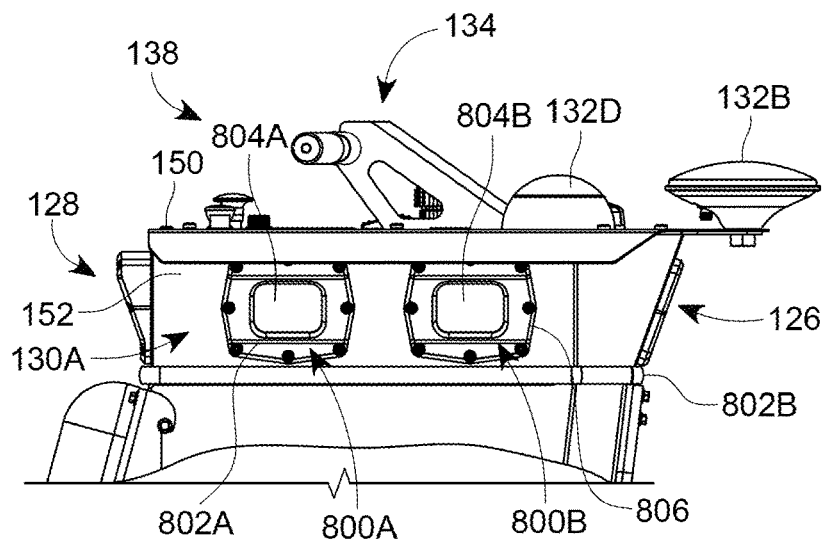
FIG. 8 is a detailed side view of a sensor suite of the autonomous lawn mower of FIG. 1 in accordance with at least one example of the invention.

FIGS. 7 and 8 respectively depict a top and side views of the top portion 138 of the podium 116 in accordance with one example of invention. The substantially planar plate 150 of the top portion 138 supports the instrument panel 134 and the plurality of radomes 132A, 132B, 132C, and 132D. The radomes are designed of materials that are transparent to electromagnetic signals and form a protective cover for antennas and sensors that are positioned within the radomes.

In one example, the radomes 132A and 132D may contain a plurality of antennas for communication transceivers and position location receivers. For example, each radome 132A and 132D may contain two WiFi antennas, two cellular telephone (e.g., LTE antennas) and one GPS antenna. The radomes 132A and 132D are spaced apart from one another to reduce interference from objects and mitigate multipath interference.

In one example, the radome 132B comprises a GNSS antenna and is mounted along a centerline of the mower at a front edge 700 of the podium top portion 138. Such positioning provides an optimal view of the sky for GNSS functionality and provides spacing between the operator (when one is onboard) and the GNSS antenna to reduce interference. In another example, the radome 132B protects an antenna for GNSS receiver (both GPS and GLONASS), an antenna for a cellular communications transceiver (e.g., LTE) and an antenna for a WiFi transceiver. The antennas respectively operate in the 1575.2-1610 MHz band, 1710-2690 MHz band and 4900-5825 MHz band. One exemplary antenna combination is available as a MIMO Combo Outdoor IP67 3m Roof Antenna, Model JCE604LMWM, available from Teltonika.

Positioned behind the radome 132B and between the radomes 132A and 132D is a radome 132C for a radio antenna. In one example, the radio antenna radome 132C protects an antenna for a 900-950 MHz radio receiver. This receiver is used to receive a remote broadcast of an emergency stop signal and cause an immediate shutdown. Details of the emergency control system are described with reference to FIGS. 10, 11 and 12 below.

Mounted to the four sides 152 of the podium top portion 138 are a plurality of stereo cameras 126, 128, 130A and 130B. Each stereo camera 126, 128, 130A and 130B may comprise a pair of camera elements 800A and 800B mounted to each side 152 of the top portion 138. In one example, the camera elements 800A and 800B are spaced apart by about 88.9 mm to facilitate adequate stereo imaging of the environment. In one example, each side and rear camera 128, 130A and 130B has a 130 degree diagonal field of view angle, while the front camera 126 may have a narrower viewing angle, such as, a 100 degree field of view angle. The front camera 126 has a slightly narrower field of view to improve forward depth perception. With such a field of view from each camera, the cameras provide 360 degree imaging of the surrounding environment. To reduce image distortion, the field of view may be narrowed for each camera, but to maintain a 360 degree view of the surrounding area, the diagonal field of view should not be less than 90 degrees, e.g., 90 degree diagonal field of view may be used. In at least some examples, various combinations of cameras may be used (e.g., wide angle, narrow angle, fish-eye, etc.) to provide for various factors. For example, a wide-angle camera may be better suited for use in determining an obstacle proximate the system as opposed to a narrow field of view lens which may be preferred for determining objects further away. Of course, image data from any such camera may be undistorted, rectified, or otherwise manipulated to provide optimal data for sensing, planning, and control. Each camera element 800A and 800B comprises a bezel 802A and 802B that retains a lens 804A and 804B. Although a rectangular shaped bezel and lens is depicted, other shapes may be used. For example, the bezel and lens may be circular. A charge-coupled device (CCD) sensor (not shown) is mounted behind each lens 804A and 804B. In one example, the camera elements 800A and 800B have a 130 degree diagonal field of view and are available from D3 Manufacturing as Model 10650 (part number 1001149-27). In one example, the individual cameras in a camera pair are spaced apart by about 88.9 mm, though any spacing is contemplated for a desired depth resolution. As above, in at least some examples, such stereo pairs may be scan line rectified. Each bezel 802A and 802B is raked forward by about 20 degrees to provide shading to the CCD sensor and to enable the camera to optimally image the surrounding environment. Such an angle reduces glare on the CCD sensor. The bezzle may comprise an inner circumferential surface and may also include at least one ridge on the inner circumferential surface proximate the lens to reduce reflection. The lens is sealed to the bezel and the bezel is sealed to the podium to facilitate waterproofing.

The top plate 150 overhangs, for example, the front and side cameras to provide shade to the cameras and reduce glare. In another example, the top plate 150 may also overhang the rear cameras as well.

Figure 13:
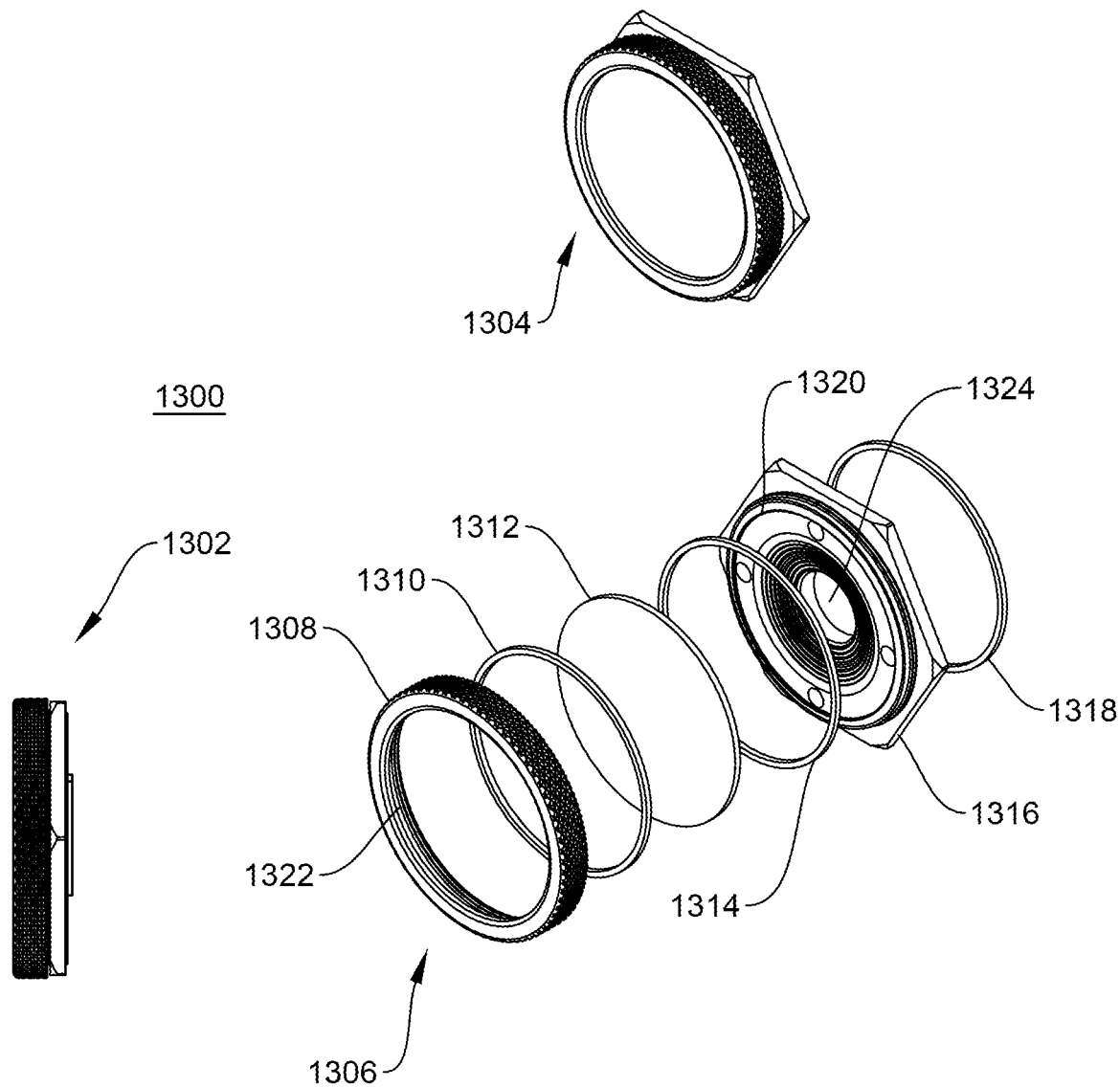
FIG. 13 depicts an example alternative camera assembly.

FIG. 13 depicts an alternative camera lens assembly 1300 showing a side view 1302, a perspective view 1304 and an exploded view 1306. The assembly 1300 comprises a bezel 1308, a first o ring 1310, a lens 1312, a second o ring 1314, a baffle 1316 and a third o ring 1318. The bezzle 1308, first o ring 1310, lens 1312, second o ring 1314 are stacked in that order and screwed onto a threaded protrusion 1320 of the baffle 1316. A portion of the baffle 1316 surrounding aperture 1324 may be ribbed, or otherwise shaped, to minimize stray light that is able to enter the aperture from wide angles. An inside surface 1322 of at least a portion of the bezel 1322 has threads that match the threads on the threaded portion 1320 of the baffle 1316. The o rings 1310 and 1314 create a waterproof seal for the assembly 1300. The baffle 1316 is mounted to the top portion of the podium using the o ring 1318 to form a waterproof seal. A camera sensor array (not shown) is mounted in the aperture 1324 behind the lens 1312. In one example, the lens is formed of Gorilla Glass from Corning Incorporated and may include an antireflective coating. The camera sensor array may comprise a charge coupled device (CCD) array.

In various examples, the lens 1312 may be planar and thin such that distortions are minimized when a commercially available camera is placed behind. In alternative examples, the lens 1312 may be formed as part of the total optical system of an imaging unit. In such examples, the lens may be warped to achieve the desired field of view (among other lens parameters). Regardless, various filters may also be used in any one or more examples. Such filters may be bandpass filters, or otherwise, to optimize for various bands of light impingent upon the final imaging surface.

Figure 14:
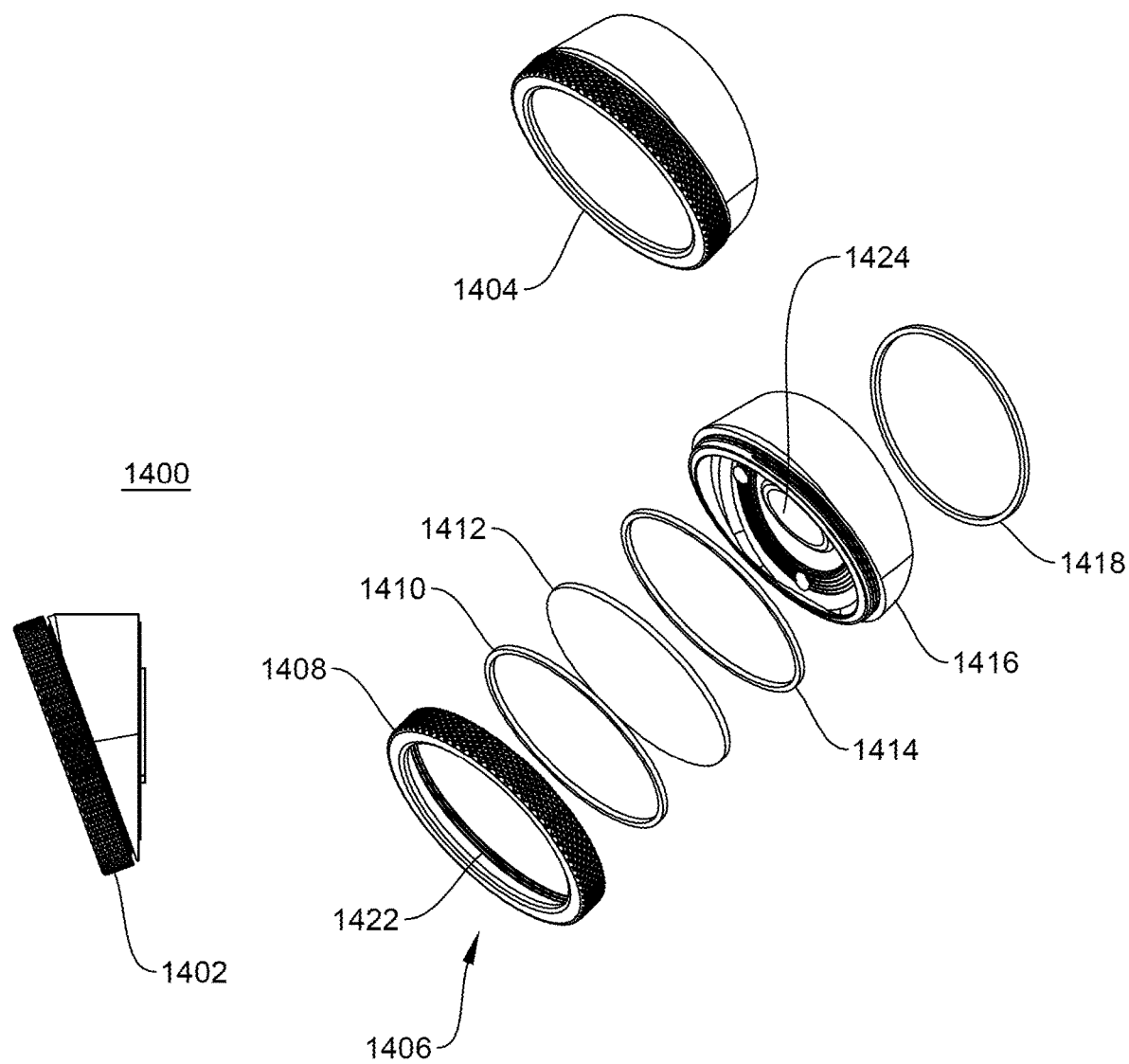
FIG. 14 depicts a further example alternative camera assembly.

FIG. 14 depicts an alternative camera lens assembly 1400 where the lens is angled (raked) forward as described above with respect to the corresponding bezzles, such as bezzles 802A and 802B illustrated in FIG. 8. FIG. 14 shows a side view 1402, perspective view 1404, and exploded view 1404. The assembly 1400 comprises a bezel 1408, a first o ring 1410, a lens 1412, a second o ring 1414, a baffle 1416 and a third o ring 1418. The bezzle 1408, first o ring 1410, lens 1412, second o ring 1414 are stacked in that order and screwed onto a threaded protrusion 1420 of the baffle 1416. An inside surface 1422 of at least a portion of the bezzle 1408 has threads that match the threads on the threaded portion 1420 of the baffle 1416. The side 1426 of the baffle is thicker at the top of then baffle than at the bottom of the baffle to cause the lens 1412 to point downward from a horizontal plane (i.e., is raked forward). The o rings 1410 and 1414 create a waterproof seal for the assembly 1400. The baffle 1416 is mounted to the top portion of the podium using the o ring 1418 to form a waterproof seal. The camera array (not shown) is mounted in the aperture 1424 behind the lens 1412 to form a camera. In one example, the lens is formed of Gorilla Glass from Corning Incorporated and may include an antireflective coating. The bezel 1408 may comprise an inner circumferential surface and may also include at least one ridge on the inner circumferential surface proximate the lens to reduce reflection. The camera array may comprise a CCD array. In various examples, lens shapes, distortions, coatings, filters, and additional lens elements may be used similar to those described with respect to FIG. 13.

In other examples, additional sensors and/or antennas may be included within the radomes or elsewhere on the top portion 138 or podium 116. Such sensors include, for example, but not limited to one or more of additional cameras in any combination including stereo, RGB, monochromatic, infrared, ultraviolet, hyperspectral, etc., RADAR antennas, pose (position and/or orientation) systems, diagnostic sensors, Inertial Measurement Units (IMUs) (which in turn may comprise accelerometers, gyroscopes, magnetometers, etc.), LIDAR receptors, ultrasonic sensors, or the like.

In one example, as mentioned previously the top portion 138 of the podium 116 shown in FIGS. 7 and 8 may be modular and may include a navigation system (e.g., GNSS and/or inertial) within the modular top portion 138. The navigation system may be used to generate a reference location to which the images from the cameras are registered. The reference location may form a reference plane for each camera pair or a reference point for all camera pairs. With a modular top portion, calibration of the cameras may be performed anywhere (i.e., away from the mower location) thus simplifying calibration. As a non-limiting example, the entire top of the unit may be detached (or not yet attached) and calibrated by one or more calibration procedures (which may include moving the unit through a series of fiducials or otherwise determining the relative positions, orientations, and intrinsic parameters of the cameras with respect to one another). Once calibrated, the unit may be attached to any corresponding mower assembly to provide visual and/or visual-inertial tracking.

Figure 15A:
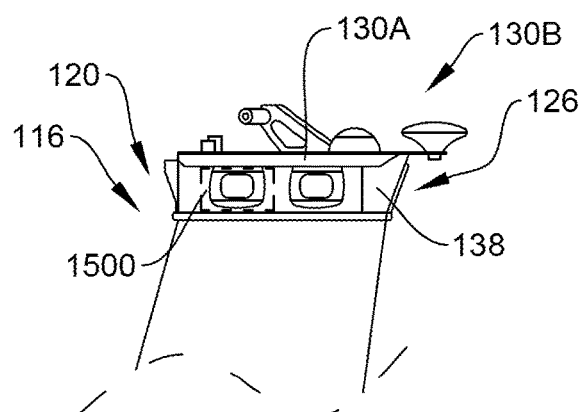
FIGS. 15A-15E depict a sequence of events to remotely calibrate the cameras of an autonomous lawn mower in accordance with at least one example of the invention.
Figure 15B:
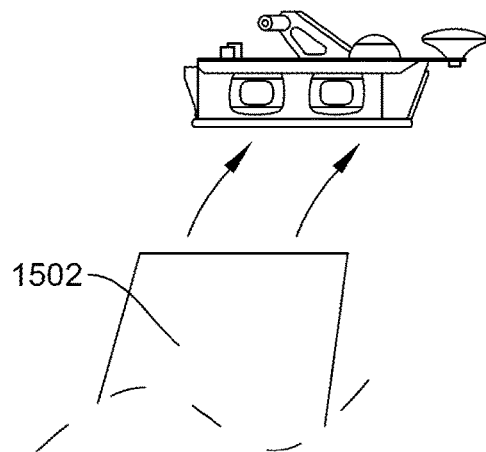
Figure 15C:
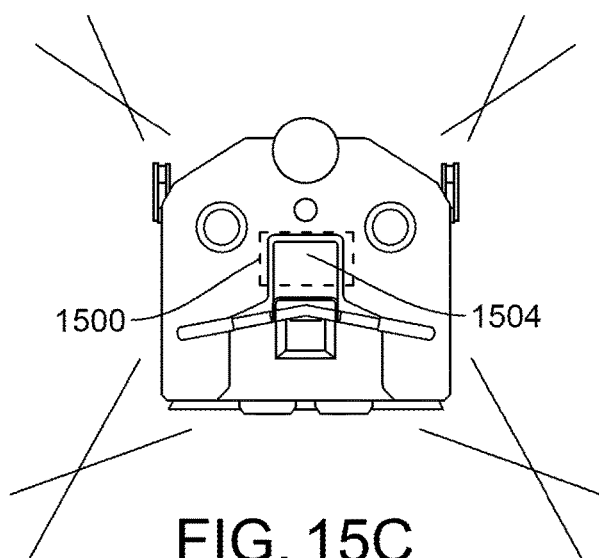
Figure 15D:
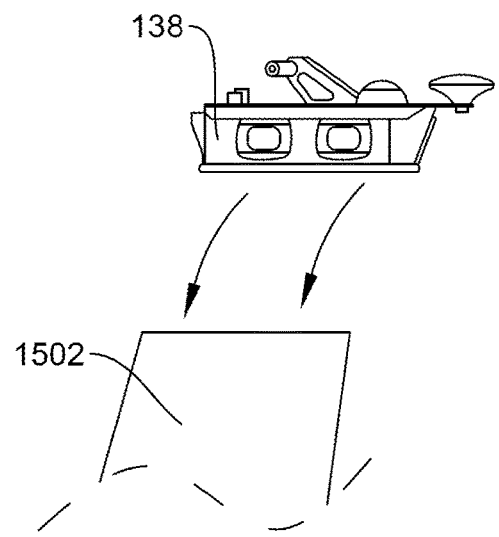
Figure 15E:
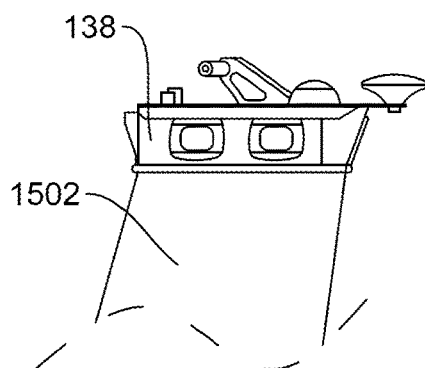

FIGS. 15A-15E depict a sequence of events to remove the top portion 138 (also referred to as the upper portion) of podium 116, calibrate the cameras, and, post calibration, replace the top portion 138 upon the podium 116 in accordance with at least one example of the invention. FIG. 15A depicts the podium portion of the mower having a modular top portion 138. The top portion 138 comprises the cameras 126, 128, 130A and 130B mounted to the top portion 138 and a navigation system 1500 (shown as dashed) within the top portion 138. FIG. 15B depicts the top portion 138 being removed from a lower portion 1502 of the podium 116. The top portion 138 may be removably retained upon the lower portion using fasteners such as bolts, clips, straps, and the like. Such joining assembly may, in some examples, further comprise gaskets or otherwise to ensure the full assembly (top portion 138 and lower mower unit) is waterproof and/or otherwise rigid with respect to the elements. FIG. 15C depicts a top view of the top portion 138 being calibrated such that the navigation system 1500 is used to define a reference point, points, plane or planes (e.g., reference point 1504) for the cameras 126, 128, 130A and 130B. As described with reference to FIGS. 7 and 8 above, a stereo camera is mounted to each of the four sides of the top portion 138, though any combination of cameras, lidars, radars, inertial measurement units (IMUs—which include accelerometers, gyroscopes, magnetometers), and GNSS receivers is contemplated. The calibration may be performed anywhere, e.g., away from the mower. FIG. 15D depicts the top portion being replaced upon the lower portion 1502 of the podium 116. FIG. 15E depicts the reassembled podium 116 comprising the lower portion 1502 and the top portion 138, where the top portion 138 comprises the calibrated cameras 126, 128, 130A and 130B.

Figure 10:
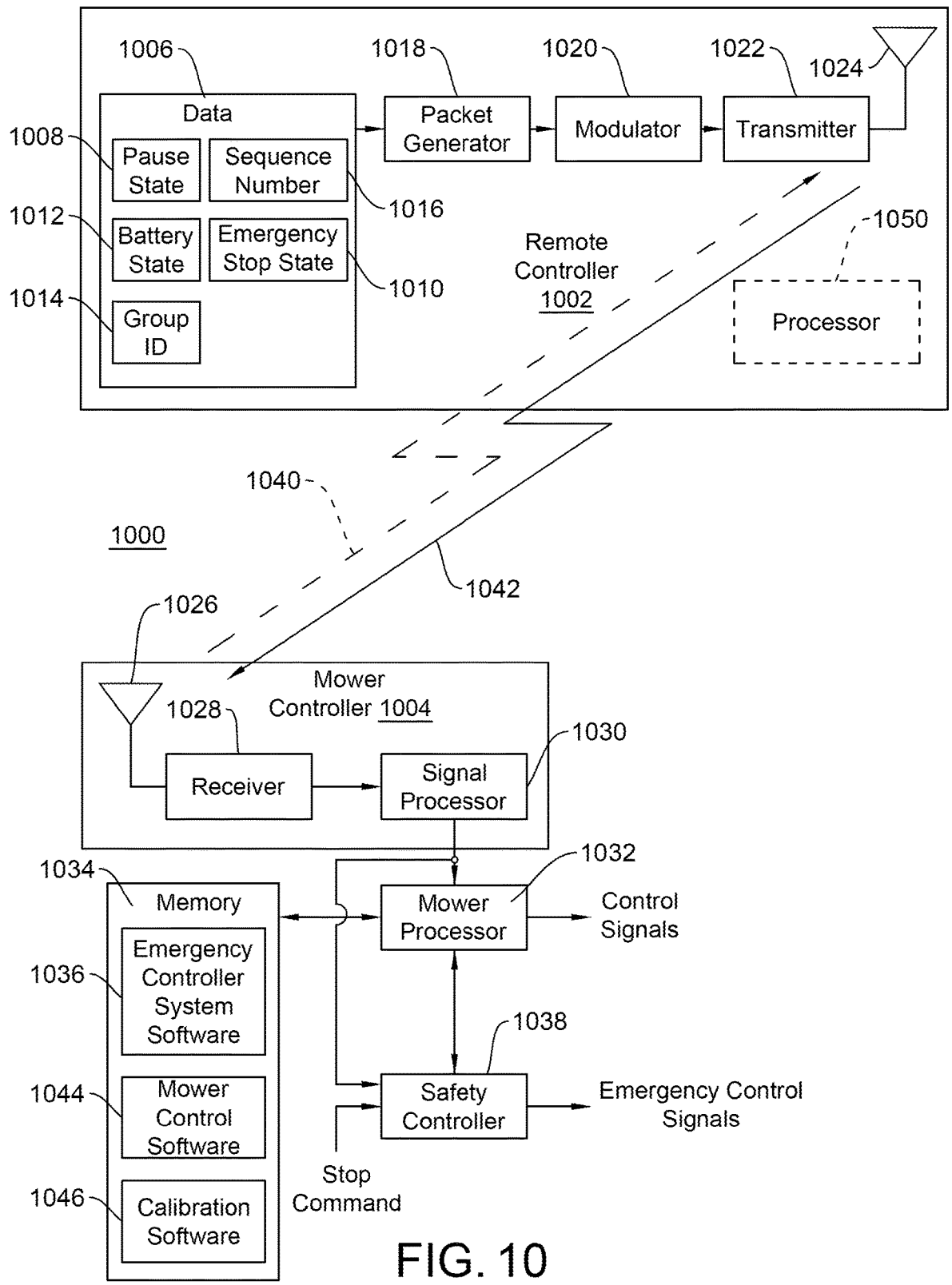
FIG. 10 depicts a block diagram of an emergency control system for an autonomous lawn mower in accordance with at least one example of the invention.

The top portion 138 may contain one or more mower processors and memory (as shown as 1032 and 1034 in FIG. 10). The memory may store mower control software and calibration software (1044 and 1046 in FIG. 10) containing instructions that, when executed by the one or more processors, cause the processor to perform certain operations. Execution of the calibration software causes the processor to calibrate the cameras by determining relative positions and orientations between the plurality of cameras, the inertial measurement unit, and the GNSS receiver, determining intrinsic parameters of the plurality of cameras, and generating a signal indicative of the calibration. This software may be executed while the top portion 138 is not attached to the lower portion 1502 of the podium 116. In additional or alternate examples, the top portion 138 may be calibrated by a separate system containing additional processors and/or memory. Such calibration may comprise receiving data from the one or more sensors associated with the top portion 138 and generating a calibration file (or other data structure). Such calibration file and/or calibration data may be subsequently transmitted to the relevant processors and/or memory associated with another portion of the mower.

Once the calibrated top portion 138 is positioned on the lower portion 1502, the one or more mower processors (which may be distributed across one or more of the top portion 138 and/or lower portion 1502) may execute the mower control software to control the mower motion and mowing operation. In one example, upon coupling the top portion 138 to the lower portion 1502 of the podium 116, execution of the mower control software causes the mower processor to: receive, upon coupling the upper portion to the lower portion, the signal indicative of calibration; receive sensor data from the plurality of cameras, GNSS, and inertial measurement unit; and control the autonomous lawn mower based at least in part on the sensor data and the signal. A detailed description of the mower control software is described in U.S. patent application Ser. No. 16/985,495, filed 5 Aug. 2020 entitled "Autonomous Lawn Mower" and U.S. patent application Ser. No. 16/894,379, filed 5 Jun. 2020 entitled "Autonomous Lawn Mowing System" which are hereby incorporated herein by reference in their entireties.

In one example, at least one ultrasonic sensor 152 may be used to generate a fail-safe signal. In one example, the ultrasonic sensor is mounted near the front of the mower, e.g., on the front of the hood 118. In other examples, the sensor 152 or sensors may be mounted elsewhere such as on the podium 116. The ultrasonic sensor monitors the space in front of the mower such that the sensor may detect objects or persons that are missed by the video imaging system or operates as a backup to the video system in case of a camera failure. If the ultrasonic sensor detects an object or person proximate the mower, the sensor generates the fail-safe signal that may be used to command the mower to halt and await operator intervention. Of course, in other examples, such a sensor may be used in combination with the cameras (or any other sensor) in any algorithm which relies on sensor fusion. As non-limiting examples, ultrasonic sensor data may be combined with one or more of camera data, radar data, lidar data, etc. to reduce an amount of uncertainty in detections within the environment.

In another example, a physical pressure sensor may replace the ultrasonic sensor or be used in conjunction with the ultrasonic sensor. The pressure sensor, when encountering an object, causes an emergency stop (as described below) procedure to be activated.

In one example, the top portion 138 of the podium 116 provides a means to communicate mower status information to people viewing the mower 100. For example, one or more illuminating devices 806 may be attached to the mower 100 and illuminated in colors or patterns to indicate mower status. In one example, the illuminating device 806 is a light emitting diode (LED) ribbon that circumscribes the entire podium 116 to provide a 360 degree indicator.

The LED ribbon may present one or more of various colors, graphics, text, and the like to indicate mower status. For example, the ribbon may display different colors for differing status, e.g., operating status such as display green when the mower is operating normally, red when the mower has stopped, and flash yellow as a warning to bystanders that may form an obstacle to the mower. In addition, a specific color, color combination, animation, or other graphic may be displayed to indicate when the mower is charging, e.g., a striped color display, or has discharged to a level that requires a charge. The LED ribbon may also be used to indicate error status (e.g., of the entire unit, a component, a subcomponent, etc.), operating status such as autonomous state or manual state, functional status such as uploading data or software, etc. In other examples, the LED ribbon may comprise an array of LEDs, where each LED may be illuminated separately to facilitate display of graphical icons, text, patterns, animation and the like. Such a display may be used for communicating diagnostic information to operators or technicians, e.g., a text display of "CHARGE REQUIRED," as well as communicating warnings to bystanders, e.g., a text display of "PLEASE STAND BACK." One example of an LED ribbon and drive circuitry is a 2 meter length of ribbon comprising 288 LEDs available from BTF-Lighting. In an example, the drive integrated circuit for the LED ribbon is model SK9822 also available from BTF-Lighting. In various examples, such visual communications may be displayed around the entirety of the system such that any user proximate the device may be able to quickly glean the system state to enhance the safe operation of the system. Also, the LED ribbon may have the graphics segmented such that different colors, text, or graphics may be displayed on different sides of the mower such that the display is directional. Thus, the mower may display an indicator intended to be seen by a person standing at a particular location relative to the mower on a portion of the ribbon facing the person. Further, the mower may utilize dynamic obstacle notification wherein, if the mower detects a person in a particular direction (e.g., 20 degrees off center), a certain color (e.g., red) or graphic may be displayed in that direction. As such, when the mower detects certain objects (e.g., people, animals, and the like) in the environment proximate the mower, specific messages, graphics, colors and the like can be directed in the direction of the object to warn or chase away the object.

Figure 9A:
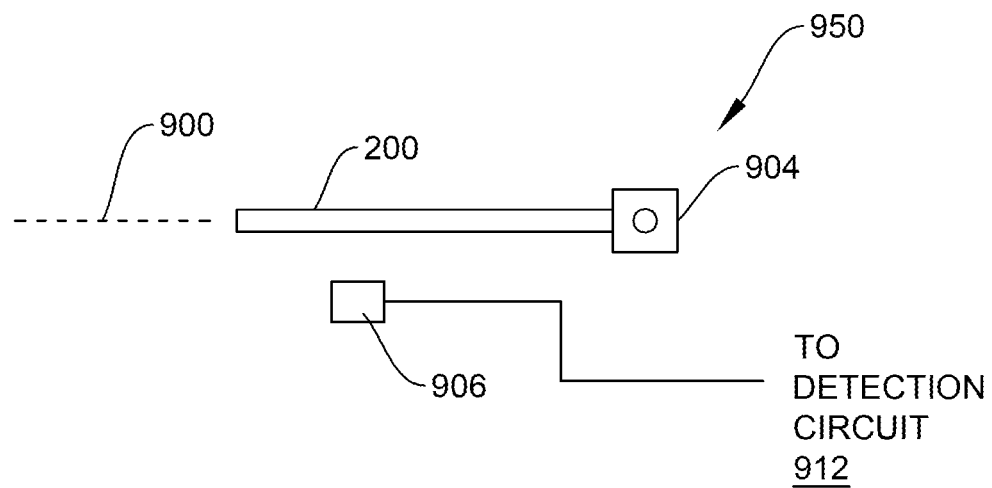
FIGS. 9A and 9B depict operation of an operator detector in accordance with at least one example of the invention.
Figure 9B:
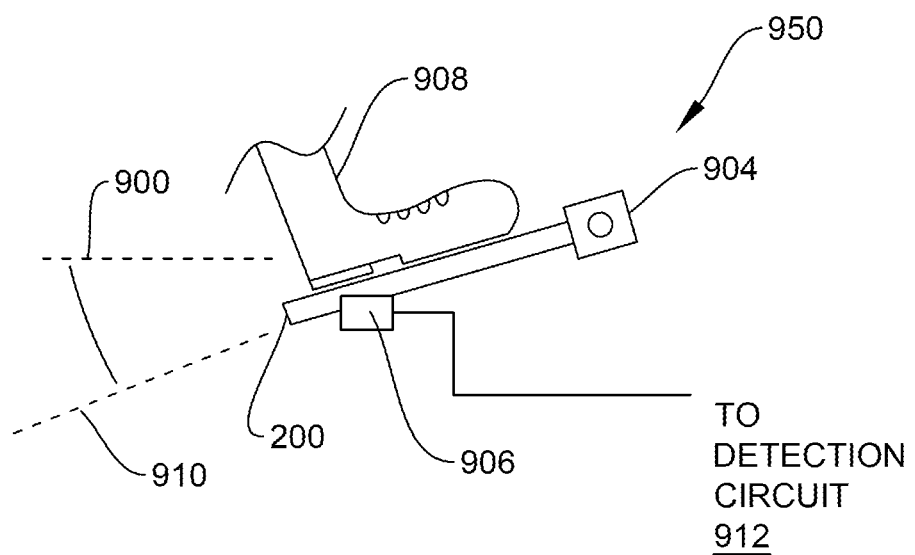

At times, the autonomous lawn mower is driven by an operator. The presence of an operator is detected when the operator stands on the operator platform 200 in FIG. 2. FIGS. 9A and 9B depict operation of an operator detector 950 in accordance with at least one example of the invention. As depicted in FIGS. 9A and 9B, the operator platform 200, without an operator, is positioned in a first position (the operatorless position 900) and is held in the operatorless position by at least one biased hinge 904, e.g., one or more springs within a hinge to form a spring loaded hinge. In position 900, the platform 200 is not proximate an inductive proximity sensor 906 that is located at the side of the platform 200. In FIG. 9B, the operator 908 stands upon the platform 200 causing the platform to pivot downward to a second position (the operator position 910). When in the operator position 910, the platform is proximate the inductive proximity sensor 906 causing a characteristic of the sensor 906 to change, e.g., the impedance of the sensor changes. In other embodiments, the platform may move vertically when the operator stands on the platform. The detection circuit 912 detects the characteristic change and places the mower in manual control mode. Other forms of sensors may be used in combination with or as a substitute for the inductive proximity sensor, e.g., hall-effect sensors, optical sensors, pressure sensors, and the like. In one example, the sensor(s) is weather resistant (e.g., a sealed enclosure without any moving parts) and does not contact the platform.

In the example where the sensor is an inductive proximity sensor, the platform is generally metallic or has a metallic component that is located proximate the sensor 906 when an operator is present. Conversely, when the operator 908 steps off the platform 200, the biased hinge 904 moves the platform away from the sensor 906 causing the detection circuit 912 to detect that the operator has departed and then stop the mower. When stopped, the mower may automatically apply the brakes. In this way, the operator detector 950 operates as a "dead man's switch."

In an example, when an operator steps upon the platform 200, the detection circuit 912 may also deactivate at least one camera (e.g., the rear facing camera 128). Since the operator will be blocking the view of the rear facing camera 128 while operating the mower, imagery from that camera is not useful and computational resources can be minimized (e.g., processors, memory, storage, etc.). As an alternative to deactivating the camera, the one or more mower processors that process the camera data may disregard the camera data from the rear facing camera 128.

FIG. 10 depicts a block diagram of an emergency control system 1000 in accordance with at least one example of the invention. Any block, step, module, or otherwise described below may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module. Of course, such blocks are presented for illustration purposes only and any one or more block, step, or module may be combined with any other, removed, split, or moved between the various systems and subsystems illustrated.

The emergency control system 1000 enables an operator to control one or more mowers. Control is facilitated using a remote controller 1002 that transmits information to one or more mowers to cause the mower(s) to pause or stop. When paused, the mower comes to a controlled stop that will not harm any of the components of the mower. When stopped in an emergency manner, the mower is immediately halted, the blades may be stopped and power may be disconnected from the electronics without regard for possible damage or data loss that may occur. As described below, the procedure used to stop the mower depends upon the situation causing the stop.

In one example, the system 1000 may comprise two portions: (1) a remote controller 1002 and (2) a mower controller 1004. The remote controller 1002 continuously transmits packets of data to the mower controller 1004 as a "heartbeat" signal, i.e., packets are transmitted periodically. If the heartbeat signal (i.e., packet reception) is interrupted, delayed, or corrupted, the mower controller 1004 causes the mower to invoke an emergency stop procedure as described with reference to FIG. 12 below. In addition, an operator may use the remote controller 1002 to send specific pause or emergency stop signals to the mower controller 1004 to cause the mower invoke a pause procedure or an emergency stop procedure. The remote controller 1002 may comprise two buttons—one for pause control and one for emergency stop. The pause control button may be depressed and the pause procedure is used for the duration that the button is depressed. Contrastingly, depressing the emergency button immediately invokes the emergency stop procedure that requires an operator to restart the mower after the emergency is rectified. Of course, any other methods may be provided. As non-limiting examples, a pause may be initiated by a rocker switch, a toggle switch, a press/press interaction, or otherwise such that a user may alternate quickly between an idle state of the mower and autonomous operation. Similarly, the emergency stop may comprise different forms to ensure that once depressed, the mower may not unintentionally restart. In various examples, one or more mechanisms may be used to ensure the operator does not inadvertently hit the emergency stop or pause when the other is desired, and vice versa. In some such examples, different forms of switches may be used that may have different sizes, colorations, notification, or otherwise to emphasize a difference between the two.

Additionally, the mower itself may include an emergency stop button located in a prominent (e.g., button 702 of FIG.

7), easy to access location on the mower. When the emergency stop button is depressed, the mower immediately performs an emergency stop procedure as described in detail below. The mower may stop or pause in response to a number of safety state inputs from operators and/or sensors. The various safety state inputs may include, but are not limited to, detection of a human in the path of or near the mower, detection of a dynamic obstacle (e.g., animals, pets, moving bicycle, etc.), detection of a statis obstacle, motor overload or struggling, battery charge state abnormalities, maximum slope allowance is reached, an operator is riding the mower, safety sensors enter a fault state or become unreliable, temperature of the mower reaches a limit, navigation/locomotion data (e.g., GNSS or vision data) reaches a maximum error state or becomes unreliable, blade motors reach a maximum resistance (e.g., blade encounters a tree stump), emergency stop inputs, mobile or web application inputs, tele-op state, tipover protection (e.g., mower senses the mower is at an angle that may cause a tipover condition) and the like.

The remote controller 1002 comprises various data sources 1006, a packet generator 1016, a modulator 1020, a transmitter 1022 and an antenna 1024. The data 1006 is derived from various sources and comprises a pause button state 1008 generated by the pause button, an emergency button state 1010 generated by an emergency button, a battery state 1012 generated by a battery charge monitor, a group ID 1014 stored in memory, and a sequence number 1016 generated by a sequence number generator. If neither the pause or emergency buttons are depressed, the packet generator periodically produces a packet. In one example, a packet is generated about every 250 ms. In one example, the payload in a packet may be approximately 40 bits comprising, for example, pause button state, emergency stop button state, group ID, a sequence number, and a battery state. The button status expresses whether a button is depressed or not, the group ID identifies a group in which a particular mower is a member, the battery status states whether the battery in the remote controller requires charging, and the sequence number is used by the mower controller 1004 to determine if a packet is dropped during transmission e.g., each packet is sequentially numbered for tracking purposes.

The packet generator 1018 sends the packet to the modulator 1020 and the modulated packet is sent to the transmitter 1022 for transmission via the antenna 1024 to the mower controller 1004. In those examples in which a 40 bit packet is used, the bandwidth utilized is about 500 kHz, though any other bandwidth is contemplated. As mentioned above, the remote controller sends a packet, for example, about every 250 ms. Other transmission rates, packet sizes and bandwidths may be used. Between packet transmissions the controller 1002 may enter a sleep mode to conserve battery power. If either the pause or emergency buttons are depressed during the sleep mode, the controller 1002 immediately awakes and sends a packet containing the current button state. To enhance security, the packet generator 1016 or modulator 1020 may use encryption and/or frequency hopping techniques. The transmitter 1022 transmits the packet in, for example, the 900 to 950 MHz band using antenna 1024. The specific frequency used may be selected to communicate with a specific mower. Antenna 1024 may be a dipole antenna. The transmission is generally capable of being received up to approximately 300 meters away from the remote controller 1002 using a line-of-sight transmission path. The transmission distance depends on transmission interference, transmission power level, antenna type, and the like.

The mower controller 1004 for the emergency control system 1000 comprises an antenna 1026, a receiver 1028, and a signal processor 1030. The antenna 1026 receives the signal transmitted by the remote controller 1002 and couples the signal to the receiver 1028. The receiver 1028 processes the received signal to remove data packets from the signal. The data packets are coupled to the signal processor 1030 where they are processed to remove the data. The signal processor 1030 check the sequence number to ensure no packets have been dropped and, if packets are dropped, how many have been dropped. If 3 seconds worth of packets (e.g., about 12 packets) are missing, the signal processor 1030 deems the heartbeat signal to have ceased and will generate an emergency stop command. In addition, the signal processor 1030 checks the group ID to ensure the received packet is meant to be received by the particular mower that has received the packet. The group ID may be assigned to a single mower for one-to-one emergency control or may be assigned to a number of mowers in a fleet for one-to-many emergency control. Also, if the signal processor 1030 detects a pause or emergency stop state in the data packet, the signal processor 1030 generates an appropriate command. Lastly, the signal processor 1030 checks the battery state to determine if the battery in the remote controller 1002 requires charge. If a low charge state is detected, the signal processor 1030 generates a low battery command.

The signal processor 1030 is coupled to at least one mower processor 1032 and at least one safety controller 1038. The mower processor and its general function is described in detail in U.S. patent application Ser. No. 16/985,495, filed 5 Aug. 2020 entitled "Autonomous Lawn Mower" (the '495 application) which is hereby incorporated herein by reference in its entirety. As described in the '495 application, the at least one mower processor 1032 is coupled to a memory 1034 (e.g., non-transitory computer readable media such as random access memory or read only memory) that stores various software and data that is used by the mower processor to operate the mower. In one example, the memory 1034 may further store emergency control system software 1036 that, when executed by the at least one mower processor, performs emergency and pause control functions as described below with respect to FIG. 12. The memory 1034 may also store mower control software 1044 and calibration software 1046, which operate as described above with respect to FIGS. 15A-15E.

In one example, the signal processor 1030 is separate from the mower processor 1032. In other examples, the functionality of the signal processor 1030 described above may be completely or partially performed by the mower processor 1032.

The safety controller 1038 is a simple controller that performs immediate emergency stop functions when a stop request occurs from the emergency stop button on the mower or on the remote controller 1002. In an emergency stop situation, the safety controller 1038 generates emergency control signals that override any control signals being produced by the mower processer 1032. As described herein, such an emergency stop may comprise any one or more of immediately stopping motion of the mower and immediately stopping the blades of the mower. For other situations (non-emergency) where the mower pauses (i.e., obstacle avoidance), the mower processor performs a controlled stop of the mower. Such a controlled stop may comprise causing the mower to quickly (i.e., less than a full amount of stopping power) stop motion of the mower while allowing the blades to freely spin without applying additional torque.

Such a stopping maneuver may preserve energy with respect to the emergency stop, as well as prevent damage to one or more systems of the mower by the large decelerations involved.

In an alternative embodiment, the transmitter 1022 and receiver 1028 may be transceivers such that information may be sent bidirectionally between the remote controller 1002 and mower controller 1030 (a solid arrow 1042 indicates a transmission path from remote controller 1002 to mower controller 1004 and dashed arrow 1040 indicates an optional transmission path from the mower controller 1004 to the remote controller 1002. In this bidirectional configuration, the remote controller 1002 may contain at least one processor 1050 for generating data for transmission and processing received data. As such, mower information (e.g., status) may be transmitted from the mower to the remote controller 1002 for display to the operator. The mower controller 1004 may transmit, for example, but not limited to, mower status (e.g., mowing, stopped, etc.), motor status (e.g., motor overload), terrain information (e.g., ground slope is too great to be traversed), battery charge status, unauthorized user has interfered with the mower or attempted to operate the mower, obstacle reporting, error messages, and the like.

In another embodiment, a single remote controller 1002 may communicate with multiple mower controllers 1004 located on a plurality of mowers. As such, a single operator could control and/or monitor a plurality of mowers.

Figure 11:
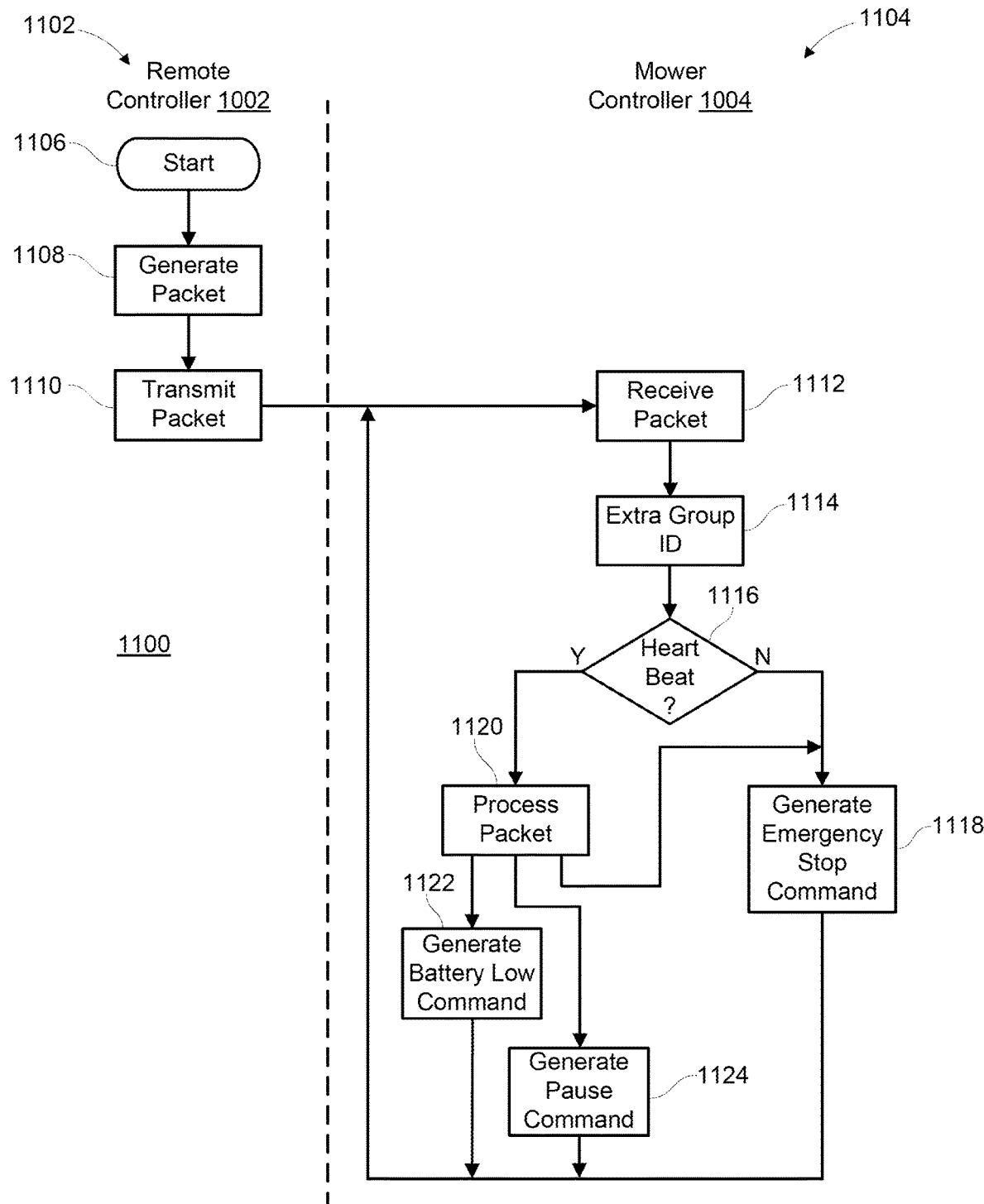
FIG. 11 depicts a flow diagram of the operation of the emergency control system of FIG. 11 in accordance with at least one example of the invention.

FIG. 11 depicts a flow diagram of a method 1100 of operation of the emergency control system 1000 of FIG. 10 in accordance with at least one example of the invention. The method 1100 is divided into portion 1102 performed by the remote controller 1002 and portion 1104 performed by the mower controller 1004. The method 1100 begins at 1106 and proceeds to 1108 where the data packets are generated. As above, such packets may comprise, for example, a timestamp, a group ID, a user ID, an amount or state of charge of the remote, or any other signal or data representative of a particular remote associated with the mower. At 1110, the packets are transmitted to the mower controller 1004.

At 1112, the packets are received by the mower controller 1004. At 1114, the method 1100 extracts the group ID from the received packet. If the group ID is correct for the particular mower, the packet is further processed and counts toward fulfilling the heartbeat signal. At 1116, the method 1100 queries if the "heartbeat signal" has been received, i.e., for example, a plurality of packets with the correct group ID have not been received in a predefined period (e.g., 3 seconds). If a packet arrives at any time during the predefined period, the period is restarted. If packets do not arrive in the designated period (i.e., the heartbeat has been lost), the method 1100 proceeds to 1118 and generates an emergency stop command. If, however, the heartbeat is not lost, the method 1100 proceeds to 1120 to extract other data from the packet. Of course, any other data checks may be implemented including, for example, cyclic redundancy checks (CRCs), bit flip checks, and any other form to determine that the packet data is correct (e.g., from the correct device) or otherwise not corrupted.

At 1120, the packet is further processed to extract the battery state, the pause state and the emergency stop state. If the battery state indicates the battery charge is low, the method 1100 generates, at 1122, a battery low command. In various examples, such a battery low command may comprise placing the mower in a pause state, stop state, or emergency stop state as a safety system (e.g., the user's ability to induce an emergency stop) may be imminently impacted. If the pause state indicates the pause button has been depressed on the remote controller 1002, the method 1100 generates, at 1124, a pause command. If the emergency stop state indicates the emergency stop button has been depressed on the remote controller 1002, the method 1100 generates, at 1118, an emergency stop command. If all states are normal (e.g., no buttons depressed and the battery charge above a low level), the method 1100 proceeds to 1112 to receive and process the next packet. Similarly, once the states are processed and commands generated, the method 1100 proceeds to 1112 to receive and process the next packet.

Figure 12:
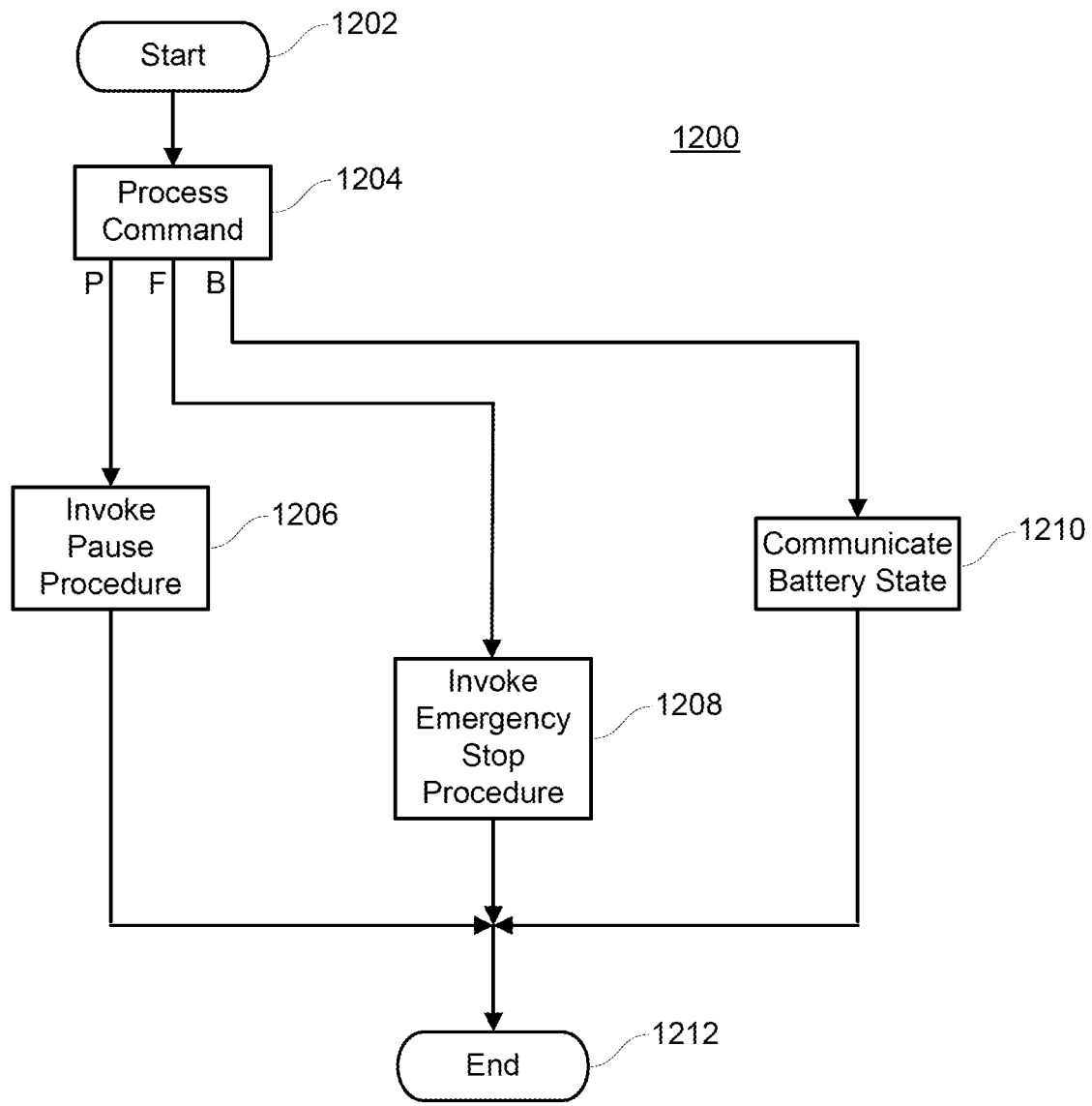
FIG. 12 depicts an example flow diagram of processing packet data received from a remote device

FIG. 12 depicts a flow diagram of a method 1200 used when the emergency control system software (1036 in FIG. 10) is executed by the mower processor in accordance with at least one example of the invention. The method 1200 may operate as an interrupt routine that is only executed upon receiving a command from the mower controller 1004 or a command from another process executing on the mower processor (e.g., the navigation process detects an obstacle that requires the mower to stop). Once a command is received, the method 1200 begins at 1202 and proceeds to 1204 where the method 1200 processes the command. If the command is a pause command, the method 1200 proceeds to 1206 where a pause procedure is invoked. The pause procedure may comprise one or more of the steps in the following exemplary procedures:

Stop for Dynamic Obstacle:
1) A dynamic obstacle (an obstacle that is moving such as a person or pet) is detected by the navigation process and a pause command is received by the mower controller
2) All mower autonomy is paused
3) Mower blade controller is instructed to stop the blades as fast as possible
4) Wheel motor controllers are instructed to stop the drive motors as fast as possible
5) The mower processor instructs the safety controller to engage the brakes when the wheels are near zero velocity
6) Wheel drive motors are idled
7) Blade motors are idled when they reach zero velocity
8) The mower processor detects when the blades have stopped and idles the motors
9) The host updates a WebUI to signal that the mower is stopped for an obstacle
10) Autonomous control is automatically resumed once the obstacle clears unless the user intervenes before autonomous control resumes Stop Because an Operator Manually Paused Autonomy:
1) An operator selects the pause button either on the remote controller or via a mobile application and a pause command is received by the mower controller
2) All mower autonomy is paused
3) Mower blade controller is instructed to stop the blades as fast as possible
4) Wheel motor controllers are instructed to stop at a reasonable negative acceleration rate
5) The mower processor instructs the safety controller to engage the brakes when the wheels are near zero velocity
6) Wheel drive motors are idled
7) Blade motors are idled when they reach zero velocity
8) The mower processor detects when the blades have stopped and idles the motors 9) The host updates the WebUI to signal that autonomy is paused Stop for Auto Detected Error:
1) An error is detected by the mower processor
2) All mower autonomy is paused
3) Mower blade controller is instructed to stop the blades as fast as possible
4) Wheel motor controllers are instructed to stop as fast as possible
5) The mower processor instructs the safety controller to engage the brakes when the wheels are near zero velocity
6) Wheel drive motors are idled
7) Blade motors are idled when they reach zero velocity
8) The mower processor detects when the blades have stopped and idles the motors
9) The host updates the WebUI to signal that autonomy is stopped because of an error
10) Autonomy is automatically resumed once the error clears unless an operator intervenes before operation resumes From 1206, the method ends at 1212.

If the command is an emergency stop command, the method 1200 proceeds to 1208 where an emergency stop procedure is invoked. The emergency stop procedure immediately stops the mower. The manner in which the mower is stopped in an emergency depends on the emergency situation. The emergency stop (also referred to as an e-stop) procedure may comprise one or more of the steps in the following exemplary procedures:

Category 0 E-Stop:
1) Stop command received by the safety controller from emergency stop button on the mower
2) Cat0 E-Stop is triggered
3) Safety controller alerts the mower processor
4) Safety controller instructs a power control contactor to open and disconnect power from all wheel drive and blade motors
5) Mower Blades begin to spin down
6) Drive motors begin to spin down
7) Wheel drive motor brakes are engaged
8) Navigation autonomy (if running) is paused
9) The mower processor updates the WebUI to signal an emergency stop has occurred Category 0 E-Stop (Alternative):
1) Stop command received by the safety controller from emergency stop button on the mower
2) Cat0 E-Stop is triggered
3) Safety controller alerts the mower processor
4) Safety controller interrupts mower operation and overrides all motor commands coming from the mower processor and instructs all motors to spin to zero velocity as fast as possible
5) Drive wheel brakes are engaged when the wheels are spinning at close to zero velocity
6) Safety controller verifies that blades have stopped spinning
7) All motors idled
8) Safety controller instructs the power control contactor to open and cut power to all mower drive and blade systems
9) Navigation autonomy (if running) is paused
10) The mower processor updates the WebUI to signal an E-stop occurred
11) If 3) through 10) do not occur within 2 seconds, open the power control contactor Category 1 E-Stop:
1) Stop command received by the safety controller from remote controller E-stop button
2) Cat1 E-Stop is triggered
3) Safety controller alerts the mower processor
4) Safety controller instructs the power control contactor to open 2 seconds after this point
5) Navigation autonomy (if running) is paused
6) The mower processor instructs the wheel drive motors to stop as fast as possible
7) The mower processor instructs the blade motors to stop as fast as possible
8) The mower processor detects when the wheels are near zero velocity, engages the brakes, and idles the wheel drive motors
9) The mower processor detects when the blade motors have stopped and idles the motors
10) If 5) through 9) were accomplished with in 2 seconds, the power control contactor opens at this point From 1208, the method ends at 1212.

If the command is a battery low command, the method 1200 proceeds to 1208 where the battery state is communicated to an operator or manager to inform them that the mower controller battery requires charging. Such communication may occur, for example, through the LED ribbon described with reference to FIG. 8, a text or email message sent from the mower, or any other mode of communication available to the mower. If the battery completely discharges, the heartbeat signal will be lost and an emergency stop will occur. As such, it is important to maintain the battery charge on the mower controller. Consequently, to avoid an emergency stop, upon receiving a low battery command, the mower may enter a pause state.

Example Clauses

A. An autonomous lawn mower comprising: a wheel connected to a wheel drive motor; a brake associated with the wheel configured to slow the wheel; a blade connected to a blade motor and configured to rotate while cutting; a wireless receiver; one or more processors; and one or more non-transitory computer readable media having instructions stored thereon which, when executed by the one or more processors, cause the one or more processors to perform operations comprising: receiving, via the wireless receiver, a signal from a remote controller, the signal comprising one or more of an emergency stop signal or a pause signal; and based at least in part on the signal comprising the emergency stop signal, causing the autonomous lawn mower to invoke an emergency stop procedure, or based at least in part on the signal comprising the pause signal, causing the autonomous lawn mower to invoke a pause procedure.

B. The autonomous lawn mower of clause A, wherein the operations further comprise: receiving, via the wireless receiver and from the remote controller, a heartbeat signal; determining an amount of time since the heartbeat signal was received; determining the amount of time meets or exceeds a threshold amount of time; and based at least in part on the amount of time meeting or exceeding the threshold amount of time, causing the autonomous lawn mower to invoke the emergency stop procedure.

C. The autonomous lawn mower of clauses A or B, wherein causing the autonomous lawn mower to invoke the emergency stop procedure comprises: causing motion of the autonomous lawn mower to immediately stop; and causing the blades to immediately stop rotating.

D. The autonomous lawn mower of clause A through C, wherein causing the autonomous lawn mower to invoke the pause procedure comprises performing one or more of: engaging the brake, idling the blade motor, idling the wheel drive motor, or notifying an operator of the pause procedure being invoked.

E. The autonomous lawn mower of clauses A through D, wherein the emergency stop procedure is one of a plurality of emergency stop procedures comprising at least: a first emergency stop procedure causing the autonomous lawn mower to perform the steps of immediately disconnecting electrical power from the blade motor and the wheel drive motor and engaging the brake, and a second emergency stop procedure causing the autonomous lawn mower to perform the steps of idling the blade motor, idling the wheel drive motor, engaging the brake, and, after the autonomous lawn mower has stopped, disconnecting electrical power from the blade motor and the wheel drive motor.

F. The autonomous lawn mower of clauses A through E, wherein the first emergency stop procedure is invoked when an emergency stop button on the autonomous lawn mower is engaged; and wherein the second emergency stop procedure is invoked when the emergency stop signal is received from the remote controller.

G. The autonomous lawn mower of clauses A through F, wherein the operations further comprise: receiving, from the remote controller, a battery state of a battery of the remote controller; determining the battery state is less than or equal to a threshold battery state; and based at least in part on the battery state being less than or equal to the threshold battery state, causing the autonomous lawn mower to invoke the emergency stop procedure.

H. The autonomous lawn mower of clauses A through G, wherein the operations further comprise: determining a mower state of the autonomous lawn mower; and transmitting the mower state to the remote controller, wherein the mower state comprises one or more of a battery state of the remote controller, a battery state of the a pause state or an emergency stop state to the mower controller.

I. A method of operation of an autonomous lawn mower system comprising: receiving, via a wireless receiver, a signal from a remote controller, the signal comprising one or more of an emergency stop signal or a pause signal; and based at least in part on the signal comprising the emergency stop signal, causing the autonomous lawn mower to invoke an emergency stop procedure, or based at least in part on the signal comprising the pause signal, causing the autonomous lawn mower to invoke a pause procedure.

J. The method of clause I, further comprising: receiving, via the wireless receiver and from the remote controller, a heartbeat signal; determining an amount of time since the heartbeat signal was received; determining the amount of time meets or exceeds a threshold amount of time; and based at least in part on the amount of time meeting or exceeding the threshold amount of time, causing the autonomous lawn mower to invoke the emergency stop procedure.

K. The method of clauses I or J, wherein the autonomous lawn mower comprises a wheel connected to a wheel drive motor, a brake associated with the wheel configured to slow the wheel, a blade connected to a blade motor and configured to rotate while cutting, a wireless receiver, and when the pause procedure is invoked, the method further performing: engaging a brake, idling a blade motor, idling a wheel drive motor, or notifying an operator of the pause procedure being invoked.

L. The method of clauses I through K, wherein the emergency stop procedure is one of a plurality of emergency stop procedures comprising at least: a first emergency stop procedure which causes the autonomous lawn mower to perform the steps of disconnecting electrical power from the blade motor and a wheel drive motor and engaging the brake, and a second emergency stop procedure which causes the autonomous lawn mower to perform the steps of idling the blade motor, idling the wheel drive motor, engaging the brake, and, after the autonomous lawn mower has stopped, disconnecting electrical power from the blade motor and the wheel drive motor.

M. The method of clauses I through L, wherein the first emergency stop procedure is invoked when an emergency stop button on the autonomous lawn mower is engaged; and wherein the second emergency stop procedure is invoked when the emergency stop signal is received from the remote controller.

N. The method of clauses I through M, further comprising: receiving, from the remote controller, a battery state of a battery of the remote controller; determining the battery state is less than or equal to a threshold battery state; and based at least in part on the battery state being less than or equal to the threshold battery state, causing the autonomous lawn mower to invoke the emergency stop procedure.

O. The method of clauses I through N, further comprising: determining a mower state of the autonomous lawn mower; and transmitting the mower state to the remote controller, wherein the mower state comprises one or more of a battery state of the remote controller, a pause state, or an emergency stop state.

P. One or more non-transitory computer readable media having instructions stored thereon which, when executed by at least one processor, cause the at least one processor to perform operations comprising: receiving a signal from a remote controller, the signal comprising one or more of an emergency stop signal or a pause signal; and based at least in part on the signal comprising the emergency stop signal, causing a lawn mower to invoke an emergency stop procedure, or based at least in part on the signal comprising the pause signal, causing the lawn mower to invoke a pause procedure.

Q. The one or more non-transitory computer readable media of clause P, wherein the operations further comprise: receiving, from the remote controller, a heartbeat signal; determining an amount of time since the heartbeat signal was received; determining the amount of time meets or exceeds a threshold amount of time; and based at least in part on the amount of time meeting or exceeding the threshold amount of time, causing the lawn mower to invoke the emergency stop procedure.

R. The one or more non-transitory computer readable media of clauses P or Q, wherein, the lawn mower comprises a wheel connected to a wheel drive motor, a brake associated with the wheel configured to slow the wheel, a blade connected to a blade motor and configured to rotate while cutting, a wireless receiver, and when the pause procedure is invoked and, when the pause procedure is invoked, the operations further comprise: engaging a brake, idling a blade motor, idling a wheel drive motor, or notifying an operator of the pause procedure being invoked.

S. The one or more non-transitory computer readable media of clause P through R, wherein the emergency stop procedure is one of a plurality of emergency stop procedures comprising at least: a first emergency stop procedure which causes the lawn mower to perform the steps of disconnecting electrical power from a blade motor and a wheel drive motor and engaging a brake, and a second emergency stop procedure which causes the lawn mower to perform the steps of idling the blade motor, idling the wheel drive motor, engaging the brake, and disconnecting electrical power from the blade motor and the wheel drive motor.

T. The one or more non-transitory computer readable media of clauses P through S, wherein the first emergency stop procedure is invoked when an emergency stop button on the lawn mower is engaged; and wherein the second emergency stop procedure is invoked when the emergency stop signal is received from the remote controller.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

The invention claimed is:

1. An autonomous lawn mower comprising:
   a wheel connected to a wheel drive motor;
   a brake associated with the wheel configured to slow the wheel;
   a blade connected to a blade motor and configured to rotate while cutting;
   a wireless receiver;
   a remote controller able to communicate with the wireless receiver;
   one or more processors; and
   one or more non-transitory computer readable media having instructions stored thereon which, when executed by the one or more processors, cause the one or more processors to perform operations comprising:
      processing signals received, via the wireless receiver, from the remote controller, wherein if it is determined by the one or more processors that the remote controller is not in functional communication with the autonomous lawn mower, at least one of an emergency stop signal or a pause signal is executed; and
      based at least in part on the signals comprising the emergency stop signal, causing the autonomous lawn mower to invoke an emergency stop procedure, which brings the autonomous lawn mower to a sudden stop regardless of whether or not any of the components of the autonomous lawn mower will be harmed; and
      based at least in part on the signals comprising the pause signal, causing the autonomous lawn mower to invoke a pause procedure, which brings the autonomous lawn mower to a controlled stop that will not harm any of the components of the autonomous lawn mower.

2. The autonomous lawn mower of claim 1, wherein
   the remote controller transmits to the autonomous lawn mower a heartbeat signal and wherein determining if the remote controller is not in functional communication with the autonomous lawn mower comprises:
   determining an amount of time since the heartbeat signal was received;
   determining the amount of time meets or exceeds a threshold amount of time; and
   based at least in part on the amount of time meeting or exceeding the threshold amount of time, causing the autonomous lawn mower to invoke the at least one emergency stop procedure or the pause procedure.

3. The autonomous lawn mower of claim 2, wherein causing the autonomous lawn mower to invoke the emergency stop procedure comprises:
   causing motion of the autonomous lawn mower to immediately stop; and
   causing the blades to immediately stop rotating.

4. The autonomous lawn mower of claim 1, wherein causing the autonomous lawn mower to invoke the pause procedure comprises performing one or more of:
   engaging the brake,
   idling the blade motor,
   idling the wheel drive motor, or
   notifying an operator of the pause procedure being invoked.

5. The autonomous lawn mower of claim 1, wherein the emergency stop procedure is one of a plurality of emergency stop procedures comprising at least:
   a first emergency stop procedure causing the autonomous lawn mower to perform the steps of immediately disconnecting electrical power from the blade motor and the wheel drive motor and engaging the brake, and a second emergency stop procedure causing the autonomous lawn mower to perform the steps of idling the blade motor, idling the wheel drive motor, engaging the brake, and, after the autonomous lawn mower has stopped, disconnecting electrical power from the blade motor and the wheel drive motor.

6. The autonomous lawn mower of claim 5, wherein the first emergency stop procedure is invoked when an emergency stop button on the autonomous lawn mower is engaged; and wherein the second emergency stop procedure is invoked when the emergency stop signal is received from the remote controller.

7. The autonomous lawn mower of claim 1, wherein
the remote controller transmits to the autonomous lawn mower a battery state of a battery of the remote controller and wherein determining if the remote controller is not in functional communication with the autonomous lawn mower comprises:
determining the battery state is less than or equal to a threshold battery state; and
based at least in part on the battery state being less than or equal to the threshold battery state, causing the autonomous lawn mower to invoke the at least one emergency stop procedure or the pause procedure.

8. The autonomous lawn mower of claim 1, wherein the operations further comprise:
determining a mower state of the autonomous lawn mower; and
transmitting the mower state to the remote controller,
wherein the mower state comprises one or more of a battery state of the remote controller, a battery state of the pause state or an emergency stop state to the mower controller.

9. The autonomous lawn mower of claim 1, wherein after the emergency stop procedure, restarting the autonomous lawn mower requires an operator.

10. A method of operation of an autonomous lawn mower system comprising:
receiving, via a wireless receiver, signals from a remote controller, wherein if it is determined that the remote controller is not in functional communication with the autonomous lawn mower, at least one of an emergency stop signal or a pause signal is executed; and
based at least in part on the signals comprising the emergency stop signal, causing the autonomous lawn mower to invoke an emergency stop procedure, which brings the autonomous lawn mower to a sudden stop regardless of whether or not any of the components of the autonomous lawn mower will be harmed; and
based at least in part on the signals comprising the pause signal, causing the autonomous lawn mower to invoke a pause procedure, which brings the autonomous lawn mower to a controlled stop that will not harm any of the components of the autonomous lawn mower.

11. The method of claim 10, further comprising:
receiving, via the wireless receiver and from the remote controller, a heartbeat signal; and
wherein the determining if the remote controller is not in functional communication with the autonomous lawn mower comprises:
determining an amount of time since the heartbeat signal was received;
determining the amount of time meets or exceeds a threshold amount of time; and
based at least in part on the amount of time meeting or exceeding the threshold amount of time, causing the autonomous lawn mower to invoke the at least one emergency stop procedure or pause procedure.

12. The method of claim 10, wherein the autonomous lawn mower comprises a wheel connected to a wheel drive motor, a brake associated with the wheel configured to slow the wheel, a blade connected to a blade motor and configured to rotate while cutting, a wireless receiver, and when the pause procedure is invoked, the method further performing:
engaging a brake,
idling a blade motor,
idling a wheel drive motor, or
notifying an operator of the pause procedure being invoked.

13. The method of claim 11, wherein the emergency stop procedure is one of a plurality of emergency stop procedures comprising at least:
a first emergency stop procedure which causes the autonomous lawn mower to perform the steps of disconnecting electrical power from the blade motor and a wheel drive motor and engaging the brake, and
a second emergency stop procedure which causes the autonomous lawn mower to perform the steps of idling the blade motor, idling the wheel drive motor, engaging the brake, and, after the autonomous lawn mower has stopped, disconnecting electrical power from the blade motor and the wheel drive motor.

14. The method of claim 13, wherein the first emergency stop procedure is invoked when an emergency stop button on the autonomous lawn mower is engaged; and wherein the second emergency stop procedure is invoked when the emergency stop signal is received from the remote controller.

15. The method of claim 10,
wherein the remote controller transmits to the autonomous lawn mower a battery state of a battery of the remote controller and wherein determining if the remote controller is not in functional communication with the autonomous lawn mower comprises;
determining the battery state is less than or equal to a threshold battery state; and
based at least in part on the battery state being less than or equal to the threshold battery state, causing the autonomous lawn mower to invoke the emergency stop procedure.

16. The method of claim 10, further comprising:
determining a mower state of the autonomous lawn mower; and
transmitting the mower state to the remote controller,
wherein the mower state comprises one or more of a battery state of the remote controller, a pause state, or an emergency stop state.

17. One or more non-transitory computer readable media having instructions stored thereon which, when executed by at least one processor, cause the at least one processor to perform operations comprising:
receiving signals from a remote controller, wherein if it is determined by the at least one processor that the remote controller is not in functional communication with the autonomous lawn mower, at least one of an emergency stop signal or a pause signal is executed; and
based at least in part on the signals comprising the emergency stop signal, causing a lawn mower to invoke an emergency stop procedure, which brings the autonomous lawn mower to a sudden stop regardless of whether or not any of the components of the autonomous lawn mower will be harmed; and based at least in part on the signals comprising the pause signal, causing the lawn mower to invoke a pause procedure, which brings the autonomous lawn mower to a controlled stop that will not harm any of the components of the autonomous lawn mower.

18. The one or more non-transitory computer readable media of claim 17, wherein the operations further comprise:
receiving, from the remote controller, a heartbeat signal; and
wherein the determining if the remote controller is not in functional communication with the autonomous lawn mower comprises:
determining an amount of time since the heartbeat signal was received;
determining the amount of time meets or exceeds a threshold amount of time; and
based at least in part on the amount of time meeting or exceeding the threshold amount of time, causing the lawn mower to invoke the emergency stop procedure.

19. The one or more non-transitory computer readable media of claim 17, wherein, the lawn mower comprises a wheel connected to a wheel drive motor, a brake associated with the wheel configured to slow the wheel, a blade connected to a blade motor and configured to rotate while cutting, a wireless receiver, and when the pause procedure is invoked and, when the pause procedure is invoked, the operations further comprise:
engaging a brake,
idling a blade motor,
idling a wheel drive motor, or
notifying an operator of the pause procedure being invoked.

20. The one or more non-transitory computer readable media of claim 19, wherein the emergency stop procedure is one of a plurality of emergency stop procedures comprising at least:
a first emergency stop procedure which causes the lawn mower to perform the steps of disconnecting electrical power from a blade motor and a wheel drive motor and engaging a brake, and
a second emergency stop procedure which causes the lawn mower to perform the steps of idling the blade motor, idling the wheel drive motor, engaging the brake, and disconnecting electrical power from the blade motor and the wheel drive motor.

\* \* \* \* \*